United States Patent
Sirota et al.

(10) Patent No.: US 11,095,620 B1
(45) Date of Patent: Aug. 17, 2021

(54) SECURE METHOD, SYSTEM, AND COMPUTER PROGRAM PRODUCT FOR EXCHANGE OF DATA

(71) Applicants: Boris Sirota, Haifa (IL); Vitaly Sirota, Haifa (IL)

(72) Inventors: Boris Sirota, Haifa (IL); Vitaly Sirota, Haifa (IL)

(*) Notice: Subject to any disclaimer, the term of this patent is extended or adjusted under 35 U.S.C. 154(b) by 85 days.

(21) Appl. No.: 16/109,775

(22) Filed: Aug. 23, 2018

Related U.S. Application Data

(60) Provisional application No. 62/550,771, filed on Aug. 28, 2017.

(51) Int. Cl.
| | |
|---|---|
| *H04L 29/00* | (2006.01) |
| *H04L 29/06* | (2006.01) |
| *G06F 21/60* | (2013.01) |
| *H04L 9/08* | (2006.01) |
| *G09C 1/00* | (2006.01) |
| *G06F 16/955* | (2019.01) |
| *H04L 29/08* | (2006.01) |

(52) U.S. Cl.
CPC ........ *H04L 63/0428* (2013.01); *G06F 16/955* (2019.01); *G06F 21/602* (2013.01); *G06F 21/606* (2013.01); *G09C 1/00* (2013.01); *H04L 9/085* (2013.01); *H04L 9/0822* (2013.01); *H04L 9/0863* (2013.01); *H04L 63/062* (2013.01); *H04L 67/2842* (2013.01); *H04L 2463/062* (2013.01)

(58) Field of Classification Search
CPC . H04L 63/04; H04L 63/0428; H04L 63/0823; H04L 63/20; H04L 41/0806; H04L 9/0822; H04L 9/085; H04L 9/0863; H04L 63/062; H04L 67/2842; H04L 2463/062; G06F 16/955; G06F 21/602; G06F 21/606; G09C 1/00
See application file for complete search history.

(56) References Cited

U.S. PATENT DOCUMENTS

2014/0189808 A1* 7/2014 Mahaffey .......... H04W 12/0609
726/4

* cited by examiner

*Primary Examiner* — Ghazal B Shehni
(74) *Attorney, Agent, or Firm* — Reches Patent

(57) ABSTRACT

A method, system and computer program product for light-weight implementation of strong encryption with zero knowledge that operates in web browser without local software installation.

19 Claims, 22 Drawing Sheets

SECURE METHOD, SYSTEM, AND COMPUTER PROGRAM PRODUCT FOR EXCHANGE OF DATA

CROSS REFERENCE

This application claims priority from U.S. provisional patent 62/550,771 filing date Aug. 28, 2017.

BACKGROUND

Computer networks are subjected to cyber attacks on a daily basis.

Users that wish to protect the data they exchange over computer networks are required to install specific software on computers of both senders and recipients. These users are required to have certain technical skills for installing and/or operating these specific software. Alternatively, these users may be assisted by other persons form the installation and/or operation of the specific software. Both sides of communication channel need to use compatible encryption software. Need to communicate with different partners may require installation of a number of different data protection programs—if communicating partners prefer to use different software. For example—many different organizations exchange data with private citizens and businesses—using different mobile devices or computers with different operation systems.

This data must be protected, but in a way that doesn't require complicated infrastructure and support for users with different skill levels.

SUMMARY

There may be provided a computerized method for encryption using a creator computer, the method may include browsing, by a web browser of the creator computer, to a web address related to an encryption engine of an cryptography service provider, and opening the encryption engine; generating by the creator computer a data encryption key using the encryption engine; encrypting, by the creator computer and using the encryption engine, data with the data encryption key to provide encrypted data; sending the encrypted data to another computer; encrypting, by the creator computer and using the encryption engine, the data encryption key with a passphrase to generate an encrypted data encryption key; generating, by the creator computer and using the encryption engine, a uniform resource locator that includes a web address related to a decryption engine of the cryptography service provider, the encrypted data; and encrypted metadata; and sending the uniform resource locator to a recipient computer. The encrypted data, the data before being encrypted, and even any metadata indicated above may be regarded as one or more messages.

The opening of the encryption engine may include opening an encryption web page, wherein the encryption engine may be embedded in the encryption web page.

There may be provided a computerized method for encryption using a creator computer, the method may include activating an application of a cryptography service provider; generating by the creator computer a data encryption key using an encryption engine accessible to the creator computer when executing the application; encrypting, by the creator computer and using the encryption engine, data with the symmetric data encryption key to provide encrypted data; encrypting, by the creator computer and using the encryption engine, the data encryption key with a passphrase to generate an encrypted symmetric data encryption key; generating, by the creator computer and using the encryption engine, a uniform resource locator that includes a web address of a cryptography service provider, the encrypted data; and encrypted metadata; and sending the uniform resource locator to a recipient computer.

There may be provided a computerized method for decryption using a recipient computer, the method may include: receiving, by the recipient computer, a uniform resource locator that includes a web address that may be related to a decryption engine of cryptography service provider, encrypted data and encrypted metadata; browsing to the web address that may be related to a decryption engine of cryptography service provider; sending the encrypted metadata to a server that may be associated with the cryptography service provider; the encrypted metadata may be an encrypted version of metadata; receiving from the server at least a portion of the metadata; the at least portion may include an encrypted data encryption key; decrypting, by the recipient computer and using the decryption engine accessible to a browser of the recipient computer when browsing to the web site of the cryptography service provider, the encrypted data encryption key to provide a data encryption key; and decrypting, by the recipient computer and using the decryption engine, the encrypted data to provide data.

There may be provided a computerized method may include generating, by the user computer, a user personal key by applying a cryptographic hashing algorithm process on at least a part of the authentication information; generating a server password by applying a cryptographic hashing algorithm on at least a part of the authentication information; generating public/private keys for asymmetric encryption and another pair for message signing encrypting a with personal key the user private keys to generate an encrypted user private keys.

SUMMARY

There may be provided a computerized method for exchange of data using a creator computer and a recipient computer, the method may include browsing, by a web browser of the creator computer, to a web address related to an encryption engine of an cryptography service provider, and opening the encryption engine; generating by the creator computer a data encryption key using the encryption engine; encrypting, by the creator computer and using the encryption engine, data with the data encryption key to provide encrypted data; encrypting, by the creator computer and using the encryption engine, the data encryption key to generate an encrypted data encryption key; generating, by the creator computer and using the encryption engine, a uniform resource locator that includes a web address related to a decryption engine of the cryptography service provider, the encrypted data and encrypted metadata; sending the uniform resource locator to the recipient computer; receiving, by the recipient computer, the uniform resource locator that includes the web address that may be related to the decryption engine of the cryptography service provider, the encrypted data and the encrypted metadata; browsing, by the recipient computer, to the web address that may be related to a decryption engine of cryptography service provider; sending the encrypted metadata to a server that may be associated with the cryptography service provider; receiving from the server at least a portion of the metadata; the at least portion may include an encrypted data encryption key; decrypting, by the recipient computer and using the decryption engine, the encrypted data encryption key to provide a data encryption key; and decrypting, by the recipient computer and using the decryption engine, the encrypted data to provide data. The encrypting of the data encryption key may include encrypting the data encryption key with a passphrase.

The encrypting of the data encryption key may include encrypting the data encryption key with a public key of the recipient.

The method may include generating the encrypted metadata; and wherein the encrypted data belongs to a message.

The generating of the encrypted metadata may include generating a message metadata that may include the encrypted data encryption key and additional metadata; and encrypting the message metadata to generate the encrypted metadata that may be decryptable by the server.

The method may include sending the encrypted metadata to another computer.

The method may include encrypting the metadata using a public key of the server.

The method may include encrypting the metadata using an additional symmetric encryption key.

The method may include positioning the encrypted metadata in a header of the uniform resource locator.

The method may include positioning the encrypted metadata in a tail of the uniform resource locator.

The additional metadata may include at least one of the following: information about expiration date, information about a maximal number of allowed decryptions by the server.

The additional metadata may include at least one of the following: a message identifier, a creator identifier, timing information.

The additional metadata may include at least one of the following: a subject of the message, one or more encryption parameters, and an indicator whether the additional metadata may include attached files.

The uniform resource locator may include a flag or mark that indicates that at least one out of the encrypted metadata and the encrypted data should not be sent to the server when the recipient clicks on the uniform resource locator.

The method may include shortening the uniform resource locator.

The shortening of the uniform resource locator may include excluding from the uniform resource locator the a web address of the cryptography service provider, any encrypted data, and any encrypted metadata.

The shortening of the uniform resource locator may include generating the uniform resource locator to may include retrieval information for receiving another uniform resource locator, the other uniform resource locator may include the web address of the cryptography service provider the encrypted data and the encrypted metadata.

The method may include sending the encrypted data to multiple recipients.

The method may include generating multiple encrypted data encryption keys, at least one data encryption key per recipient, by using public keys or passphrases of the multiple recipients.

The method may include determining by the server, before decrypting the encrypted metadata, whether to decrypt the encrypted metadata; and selectively decrypting the encrypted metadata based on the determining.

The determining may be based on additional metadata included in the metadata.

The method may include storing at least one key of the data encryption key and the encrypted data encryption key in at least one of a cache and a remote data storage.

The method may include automatically inserting a public key of a contact or a passphrase of a contact following a reception of a contact name from the user.

The method may include sending a reply from the recipient computer to the creator computer using an identifier of a user of the creator computer, the identifier included in the encrypted message metadata.

The encrypting of the data encryption key to generate an encrypted data encryption key may include encrypting the data encryption key using a user personal key.

The method may include generating the user personal key based on at least a first part of authentication information provided by the user.

The generating of the user personal key may include applying, one or more times, a cryptographic hashing algorithm on at least a part of the authentication information.

The at least part of the authentication information may be a concatenation of an email address of the user and a password provided by the user.

The method further may include generating a server password based on at least a second part of the authentication information.

The browsing to the web address may be related to a first user and a second user may be related to the recipient computer; wherein the method may include: receiving a request from the second user to send data to the first user; determining whether the identifier of the first user may be included in the at least portion of the encrypted metadata; wherein when the identifier of the first user may be included in the at least portion of the encrypted metadata then automatically retrieving a public key related to the first user and utilizing the public key during an encryption process related to the sending of the data to the first user.

The browsing to the web address may be related to a first user and a second user may be related to the recipient computer; wherein the method may include receiving a request from the second user to forward a message sent by the first user; and retrieving from the encryption engine at least one key related to a user to which the message may be forwarded to.

The browsing to the web address may be related to a first user and a second user may be related to the recipient computer; wherein the method may include receiving a request from the second user to forward a message sent by the first user; generating a new message that may include one or more decryption keys for the message sent by the first user, which are encrypted for the new recipient and a pointer to the message sent by the first user.

The web address related to the encryption engine of the cryptography service provider may be also related to the recipient; and wherein the method may include automatically fetching, by the encryption engine, a public key of the recipient for encrypting the message.

The method may include generating metadata that may include a link to the previous message in a list The decrypted data may be provided to a web application.

The encrypted data may include data blocks, each of the data blocks may be encrypted with different a encryption key and each of the corresponding keys may be encrypted for different groups of recipients.

At least one of the data blocks may include payment information encrypted by keys of a financial institution, the keys of the financial institution are not provided to the recipient.

The encrypting of a user private data to generate an encrypted user private data may include encrypting the user private data using a user personal key.

The user private data may include at least one out of user encryption keys, user contacts details, search index for sent and received messages.

The method may include storing at least a part of the use private data in at least one of a cache and a remote data storage.

Any reference above to a method should be applied mutatis mutandis to a system capable of executing the method and should be applied mutatis mutandis to a non-transitory computer readable medium that stores instructions that once executed by a computer result in the execution of the method.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
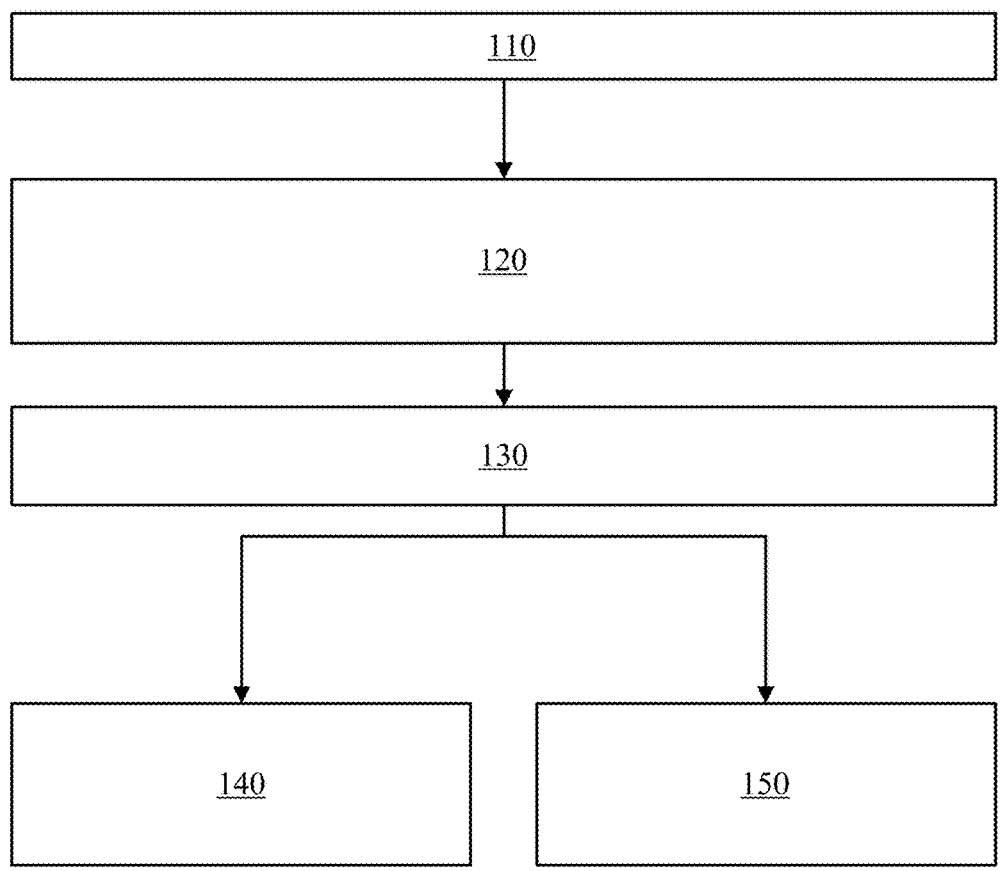
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

URL stands for Uniform Resource Locator. The URL is indicative of a location of a web resource on a computer network and a mechanism to retrieve the web source.

There may be provided a system, method and computer program product that provides encryption of data conveyed over one or more digital communication channels such as email, instant messaging, sms or other channels. The encryption is performed on sender device (computer/smartphone/tablet), without sending password or unencrypted private key and data over the network.

There is provided a way to protect communication between different parties that doesn't require installation of any software and keeps all the passwords, passphrases, encryption keys and data protected even from cryptography service provider (zero knowledge). The system, method and computer program product may generate a URL that may include a web address of a cryptography service provider, encrypted data, and encrypted metadata. The URL may be received by a recipient computer (a computer of a recipient—the recipient may be a user that is the intended recipient of the encrypted data). The recipient computer and a cryptography service provider computer may participate in decrypting the encrypted data.

The URL may point to a location that stores the web address of a cryptography service provider, encrypted data, and encrypted metadata. For example—the URL may be a shortened representation of another URL that includes the web address of the cryptography service provider, the encrypted data, and the encrypted metadata.

The user may request to encrypt a message that includes message content (such as text) and one or more attaches files.

The message content and the one or more attached files may be referred to as data and they may be encrypted to provide the encrypted data. Alternatively, the data may include message content and retrieval information for retrieving the one or more attached files.

The cryptography service provider may execute cryptographic operations on one or more servers or other computers. The term "server" may be used to represent a computer associated with the cryptography service provider.

A user computer may receive access to a decryption engine and/or an encryption engine when browsing to the web site of the cryptography service provider. Additionally or alternatively, the user computer may download an application that provides access to the decryption engine and/or the encryption engine.

FIG. 1 illustrates an example of method 100.

Method 100 is a sign up process.

Method 100 may start by initialization step 110.

Initialization step 110 may include browsing to web site of a cryptography service provider and/or downloading a cryptography service provider application.

Initialization step 110 may be followed by step 120 of providing to a user computer authentication information such as user contact information (for example email address, phone number or any other contact information including social media or other application identifier) and a user password. The user computer provides (directly or indirectly) the authentication information to the server.

Step 120 may be followed by step 130 of generating, by the user computer, a user personal key by applying a cryptographic hashing algorithm on at least a part of the authentication information.

Step 130 may include, for example applying a Password-Based Key Derivation Function (such as PBKDF2) one or more times (for example n1 times, n1 being a positive integer) on concatenation of the user email with the user password to generate the user personal key.

Step 130 may be followed by steps 140 and 150.

Step 140 includes generating a server password by applying a cryptographic hashing algorithm on at least a part of the authentication information. The authentication information used for generation of the service password should be different from what was used for generation of personal key in the previous step—to make sure that personal key could not be derived from the service password and that cloud service is zero knowledge. The server password may be sent to a server associated with the cryptographic service provider.

Step 140 may include applying a Password-Based Key Derivation Function (such as PBSDF2) one or more times (for example n2 times, n2 being a positive integer) on concatenation of the user password with user email (in opposite order to what was used for personal key generation).

Step 150 includes generating public/private keys for asymmetric encryption and another pair for message signing Step 160 includes encrypting with personal key (by the user computer) the user private keys (generated in step 150) to generate an encrypted user private keys. The encrypted user private keys may be sent to the server. The encrypted user private keys may be stored only in the server, may be stored only in the user computer, or may be stored in both server and user computer.

Step 160 may include applying symmetric and/or asymmetric encryption.

Method 100 may also include
  a. The sign-up program running in the browser sends to the User Management and Public Keys Service 11 authentication information (without user password), server password generated in step 140 and unencrypted public keys generated in step 150.
  b. The User Management and Public Keys Service 11 creates new user with provided authentication information and server password—and stores unencrypted public keys for this user.
  c. The sign-up program running in the browser stores in the Data Storage 15 the private keys generated in step 150, which are encrypted using user personal key generated in step 130.

When applying a symmetric encryption then the symmetric key of the user may be generated by a user computer and may or may not be kept at the client computer and may not be distributed outside the user computer.

When applying an asymmetric encryption then the private key of the user may be generated by the user computer and may or may not be kept at the client computer and not distributed outside the user computer. Any public key of the user may be distributed outside the client computer.

Any of the steps executed by the user computer may be assisted by the web site of the cryptography service provider and/or by the cryptography service provider application. Especially—any cryptography operation (encrypting, decrypting) can be executed using code or instructions provided by the web site of the cryptography service provider and/or by the cryptography service provider application.

Using an application may provide better protection against phishing attempts that may involve sending to the user a URL that is similar to the web address of the cryptography service provider but differ from the URL of the web site of the cryptography service provider.

Figure 2:
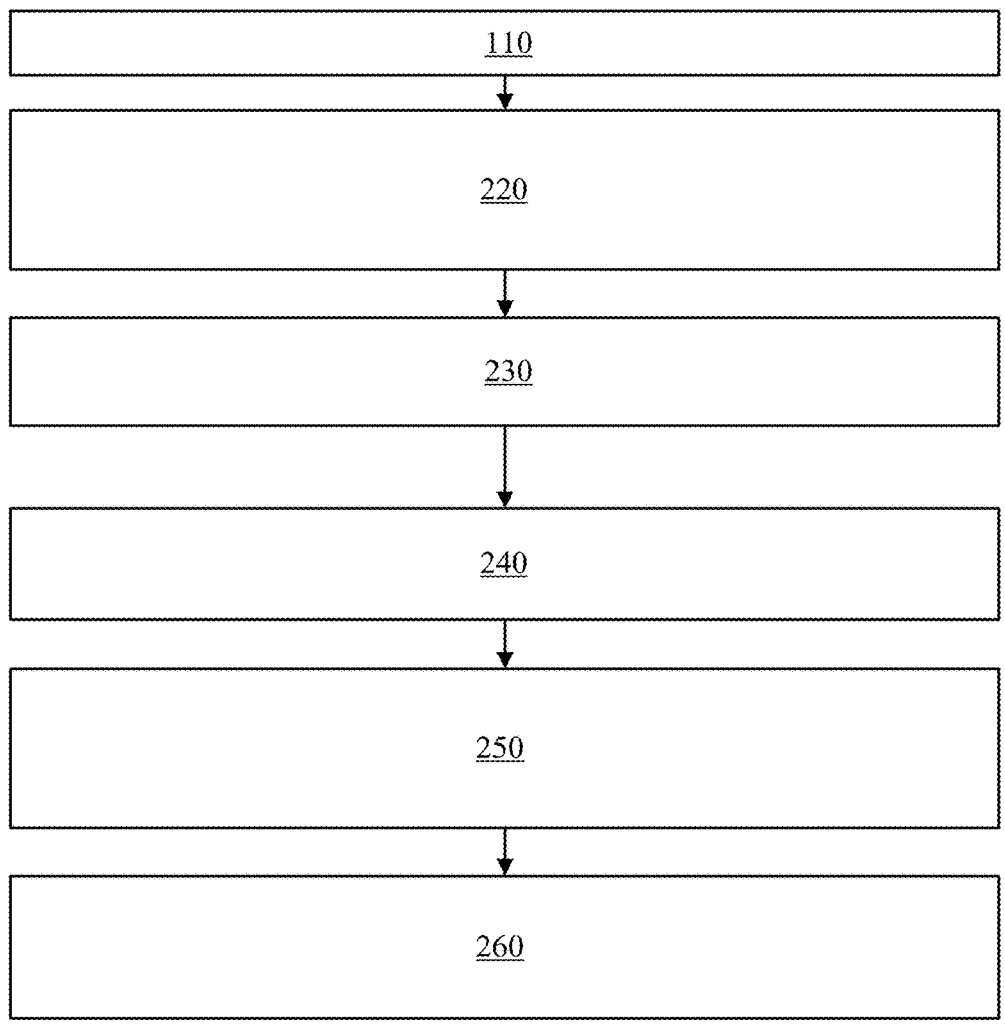
FIG. 2 illustrates an example of a method.

FIG. 2 illustrates an example of method 200.

Method 200 is a login process.

A user that wants to send an encrypted message to another user may log in before generating the encrypted message.

Method 200 may start by initialization step 110.

Initialization step 110 may include browsing to web site of the cryptography service provider and/or executing the cryptography service provider application.

Initialization step 110 may be followed by step 220 of providing to the user computer authentication information such as user contact information (for example email address, phone number or any other contact information including social media or other application identifier) and a user password.

Step 220 may be followed by step 230 of generating, by the user computer, a user personal key by applying a cryptographic hashing algorithm on at least a part of the authentication information.

Step 230 may be followed by step 240 of generating, by the user computer, a server password by applying a cryptographic hashing algorithm on at least a part of the authentication information.

Step 240 also includes sending the server password generated during step 230 to the server and send a request to retrieve the encrypted user private key stored in the server.

If the server password generated during step 240 matches the server password that is stored in the server (and was generated during method 100) then the server will send the encrypted user private keys and step 240 may be followed by step 250 of receiving by the user computer the encrypted user private key and decrypting, by the user computer, the encrypted user private key to provide the user private key. Step 250 may include reversing the encryption process of step 160.

Step 250 may be followed by step 260 of generating random session key, encrypting the personal key with it, storing the session key on the local computer and storing the encrypted personal key on the server.

Figure 3:
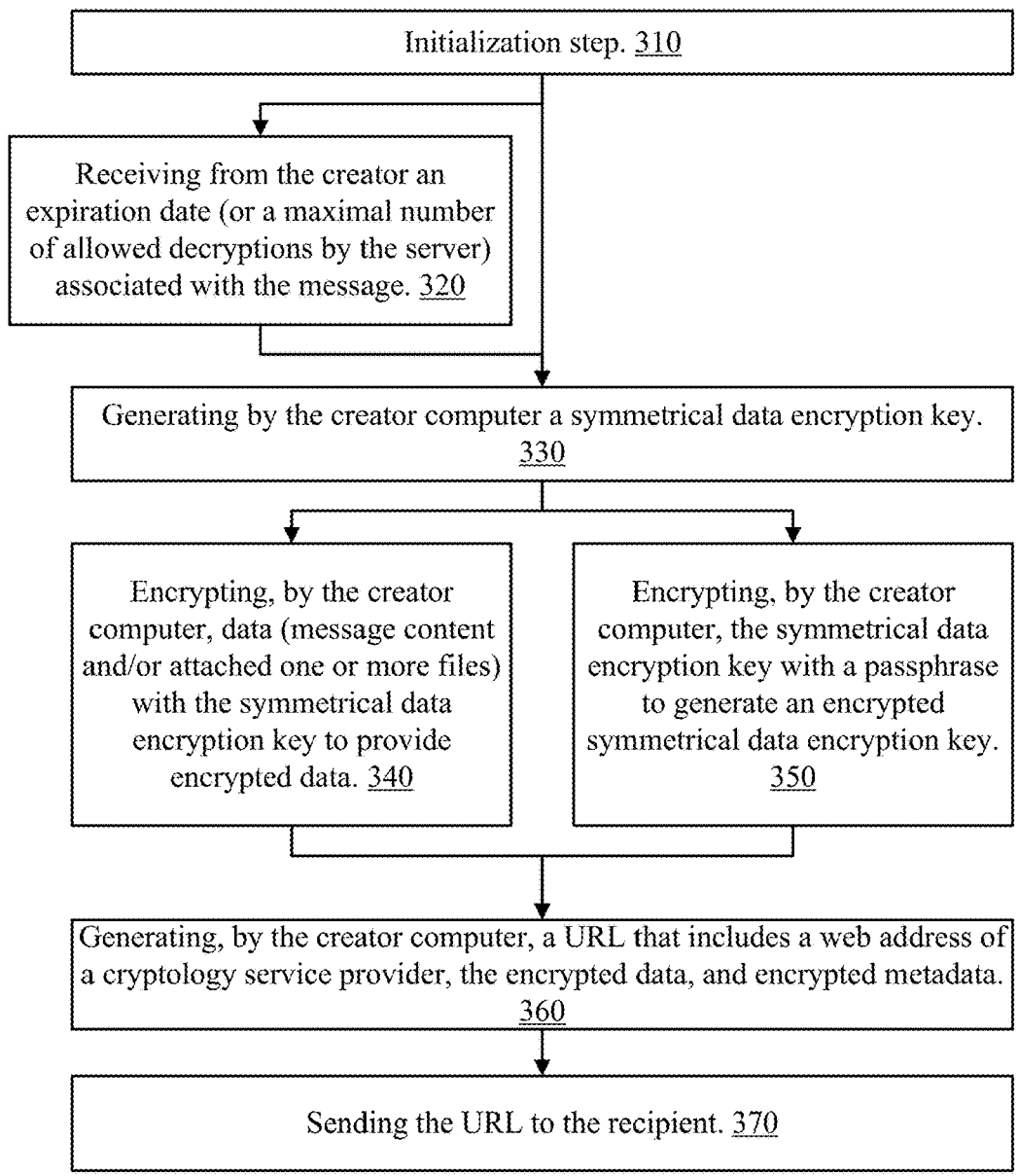
FIG. 3 illustrates an example of a method.

FIG. 3 illustrates method 300.

Method 300 is an encryption method.

Method 300 may be executed when the recipient (another user) did not perform a signup process. Method 300 may also be executed by logged-in user if he doesn't provide identification for the recipient (which is needed to access recipient public key from the service) and selects to use symmetric encryption.

Method 300 may be executed by a user that is referred to as a creator. The computer of the creator is referred to as a creator computer.

Method 300 starts by initialization step 310.

Initialization step 310 may include browsing to web site of the cryptography service provider and/or executing the cryptography service provider application.

Initialization step 310 may be followed by step 320 of receiving from the creator an expiration date (or a maximal number of allowed decryptions by the server) associated with the message. The expiration data (or the maximal number of allowed decryptions) can be determined in other manners, may have a default value known to the user computer, and the like.

Step 320 or step 310 (when step 320 is not executed) may be followed by step 330 of generating by the creator computer a symmetric data encryption key (for example a random AES-256 encryption key). It should be noted that the step 330 may include generating public and private data encryption keys instead of (or in addition) to the generating of the symmectric data encryption key.

Step 330 includes using the encryption engine accessible by the web site of the cryptography service provider and/or accessible by the cryptography service provider application.

Step 330 may be followed by steps 340 and 350.

Step 340 may include encrypting, by the creator computer, data (message content and/or one or more attached files and/or links to the one or more files) with the symmetric data encryption key to provide encrypted data.

Step 340 may include sending the encrypted data to the server or another storage system.

Step 350 may include encrypting, by the creator computer, the symmetric data encryption key with a passphrase to generate an encrypted symmetric data encryption key.

The passphrase should be known to the creator and to the recipient. The passphrase may be generated by any party and may distributed in any manner (meeting, phone call, email, or any other communication link) to the creator and/or to the recipient. Step 350 should be executed after the passphrase is known to the creator computer. The passphrase may be generated automatically on the sender computer.

Steps 340 and 350 may be followed by step 360 of generating, by the creator computer, a URL that includes a web address of a cryptography service provider, the encrypted data, and encrypted metadata.

The encrypted data included in the URL may include encrypted message content and or one or more attached files. Alternatively, the encrypted data included in the URL may include the encrypted message content and retrieval information for retrieving the encrypted one or more attached files.

Step 360 may include encrypting metadata to generate the encrypted metadata.

The metadata may include the encrypted symmetric data encryption key and additional metadata.

Step 360 may include encrypting the metadata by applying a symmetric or asymmetric encryption to provide the encrypted metadata.

The encryption of step 360 may result in a double encryption of the symmetric data encryption key—the first encryption occurs during step 350 and the second encryption occurs during step 360.

Step 360 may include encrypting the metadata using a public key of the server.

Step 360 may include encrypting the metadata using an additional symmetric encryption key.

The encrypted metadata may be positioned in any place in the URL—it may form a header, a tail, and the like.

The encrypted metadata includes encrypted additional metadata that may be generated by encrypting the additional metadata.

The additional metadata may include, for example, at least one of the following: (a) information about expiration date (or a maximal number of allowed decryptions by the server), (b) a message identifier, (c) a creator identifier, (d) timing information such as a timestamp, (e) time zone offset (offset related to the geographical region in which the creator computer was when generating the URL), (f) a subject of the message, (g) one or more encryption parameters and/or attributes—such as symmetric or asymmetric, whether it includes message content and/or attached files.

Different iterations of method 300 may be associated with different encryption parameters.

The URL may include a flag or mark (such as a hashtag) that indicates that the encrypted metadata should not be sent to the server when the recipient clicks on the URL.

A non-limiting example of a URL is illustrated below: web address of a cryptography service provider #encrypted-metadata-encrypted-data Any combination of encrypted data and encrypted metadata may appeal after the hashtag. There may be a flag between the encrypted data and encrypted metadata—but this is not necessarily so and a continuous sequence of symbols may include the encrypted data and encrypted metadata.

A non-limiting example of a URL may be: https://cryptolize.com/decryption#O3YwHpDUyW1atCak0S9SR9IVX . . .

Wherein:
 a. https://cryptolize.com is the web address of a cryptography service provider and "/decryption" indicates that a decryption engine should be used.
 b. O3YwHpDUyW1atCak0S9SR9IVX . . . is a combination of the encrypted metadata and the encrypted data.

The URL illustrated above could be quite long and method 300 may include generating a shorter URL that will not include the web address of the cryptography service provider, encrypted data, and encrypted metadata—but rather include retrieval information for retrieving (for example from the server or from a storage system) a longer URL that includes the web address of the cryptography service provider the encrypted data and the encrypted metadata.

The longer URL may be identified by a longer URL identifier.

The shorter URL may include the web address of the cryptography service provider and the longer URL identifier.

Once the server receives the shorter URL it may use the longer URL identifier to retrieve the longer URL.

Step 360 may be followed by step 370 of sending the URL to the recipient. The URL can be sent to the recipient by any means—email, sms, instant message, twitter—or even could be posted on a web site (e.g. social network).

Figure 4:
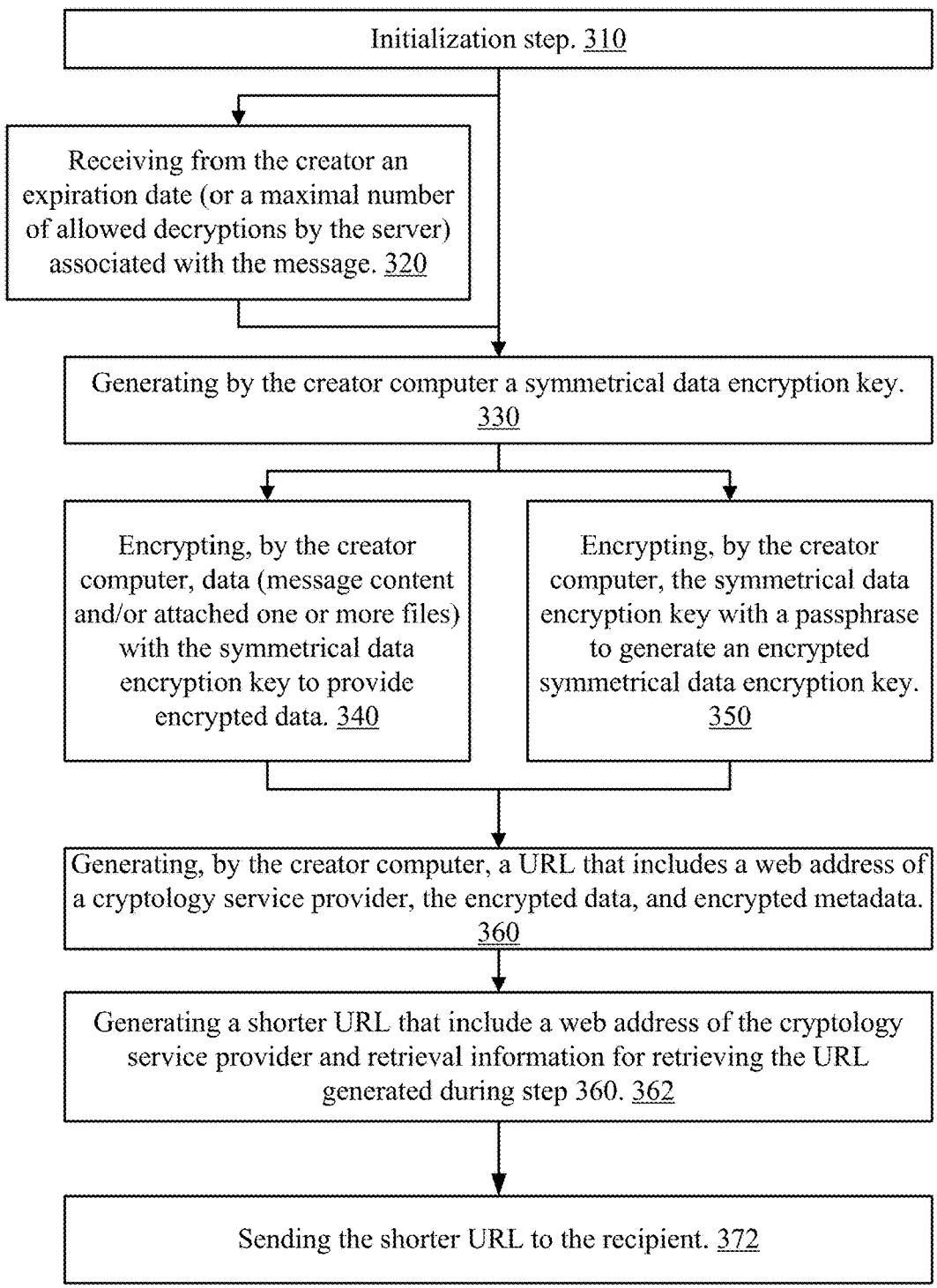
FIG. 4 illustrates an example of a method.

FIG. 4 illustrates method 302.

Method 302 is an encryption method.

Method 302 includes steps 310, 320, 330, 340, 350, 360, 362 and 372.

Method 302 differs from method 300 by including steps 362 and 372 instead of step 370.

Step 362 is preceded by step 360.

Step 362 includes generating a shorter URL that includes a web address of the cryptography service provider and retrieval information for retrieving the URL generated during step 360.

Step 362 may be followed by step 372 of sending the shorter URL to the recipient. The shorter URL can be sent to the recipient by any means—email, sms, instant message, twitter—or even could be posted on a web site (e.g. social network).

Figure 5:
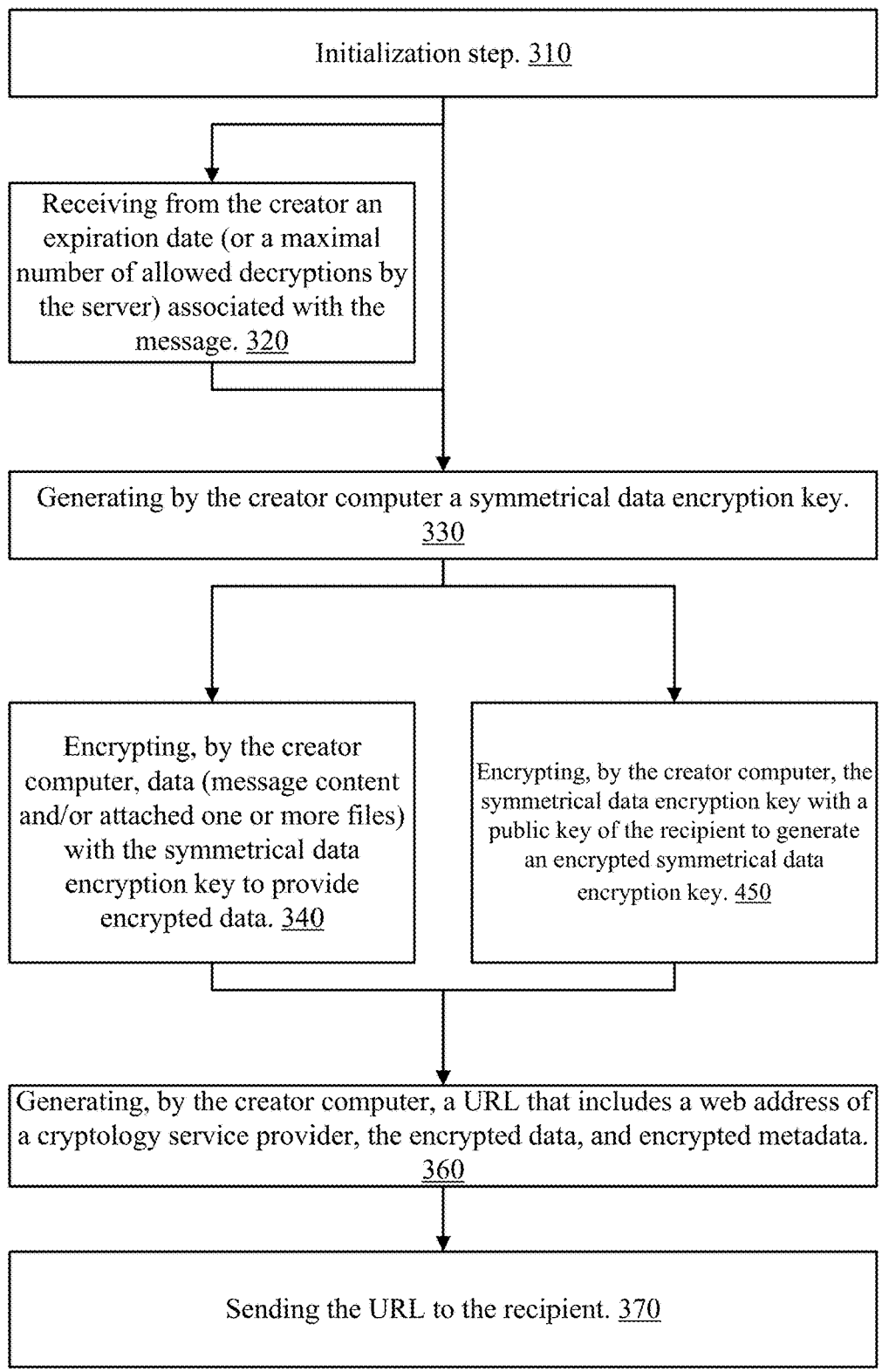
FIG. 5 illustrates an example of a method.

FIG. 5 illustrates method 400.

Method 400 is an encryption method.

Method 400 may be executed by a user that is referred to as a creator. The computer of the creator is referred to as a creator computer.

Method 400 starts by initialization step 310.

Initialization step 310 may include browsing to web site of the cryptography service provider and/or executing the cryptography service provider application.

Initialization step 310 may be followed by step 320 of receiving from the creator an expiration date (or a maximal number of allowed decryptions by the server) associated with the message. The expiration data (or the maximal number of allowed decryptions) can be determined in other manners, may have a default value known to the user computer, and the like.

Step 320 or step 310 (when step 320 is not executed) may be followed by step 330 of generating by the creator computer a symmetric data encryption key (for example a random AES-256 encryption key).

Step 330 include using the encryption engine accessible by the web site of the cryptography service provider and/or accessible by the cryptography service provider application.

Step 330 may be followed by steps 340 and 450.

Step 340 may include encrypting, by the creator computer, data (message content and/or attached one or more files) with the symmetric data encryption key to provide encrypted data.

Step 340 may include sending the encrypted data to the server or another storage system.

Step 450 may include encrypting, by the creator computer, the symmetric data encryption key with a public key of the recipient to generate an encrypted symmetric data encryption key. The public key of the recipient may be used as a recipient identifier.

Steps 340 and 450 may be followed by step 360 of generating, by the creator computer, a URL that includes a web address of a cryptography service provider, the encrypted data, and encrypted metadata.

Step 360 may be followed by step 370 of sending the URL to the recipient. The URL can be sent to the recipient by any means—email, sms, instant message, twitter—or even could be posted on a web site (e.g. social network).

It should be noted that when the encrypted data should be sent to multiple recipients then step 450 may generate multiple encrypted symmetric data encryption keys—by using the public keys of the different recipients—one encrypted symmetric data encryption keys per each recipient. Each encrypted symmetric data encryption key is generated by using a public key of one of the recipients. The multiple encrypted symmetric data encryption keys may be generated from the same key used for encrypting the data.

The multiple encrypted symmetric data encryption keys may be included in the metadata and then encrypted to generate the encrypted metadata.

The server and/or the creator computer may store a database of user and their public keys. The users may be users that performed a log in but this is not necessarily so. There may be a mapping between a recipient identifier—such as a recipient email address—and the recipient public key. Thus, the creator computer may receive from the creator the recipient identifier (such as email address) and may retrieve the public key based on the mapping.

The creator may select whether to apply symmetric or asymmetric encryption.

Any combination of methods 300 and 400 may be provided. For example, the creator may apply method 300 on data that is sent to a first recipient and may decide to apply method 400 on the same data—when the target is another recipient.

The creator may use any method of methods 300 and 400 even when the recipient performed a signup process or otherwise can be regarded as a registered user of the cryptography service provider.

Step 360 may be followed by step 362. Step 362 may be followed by step 372.

Figure 6:
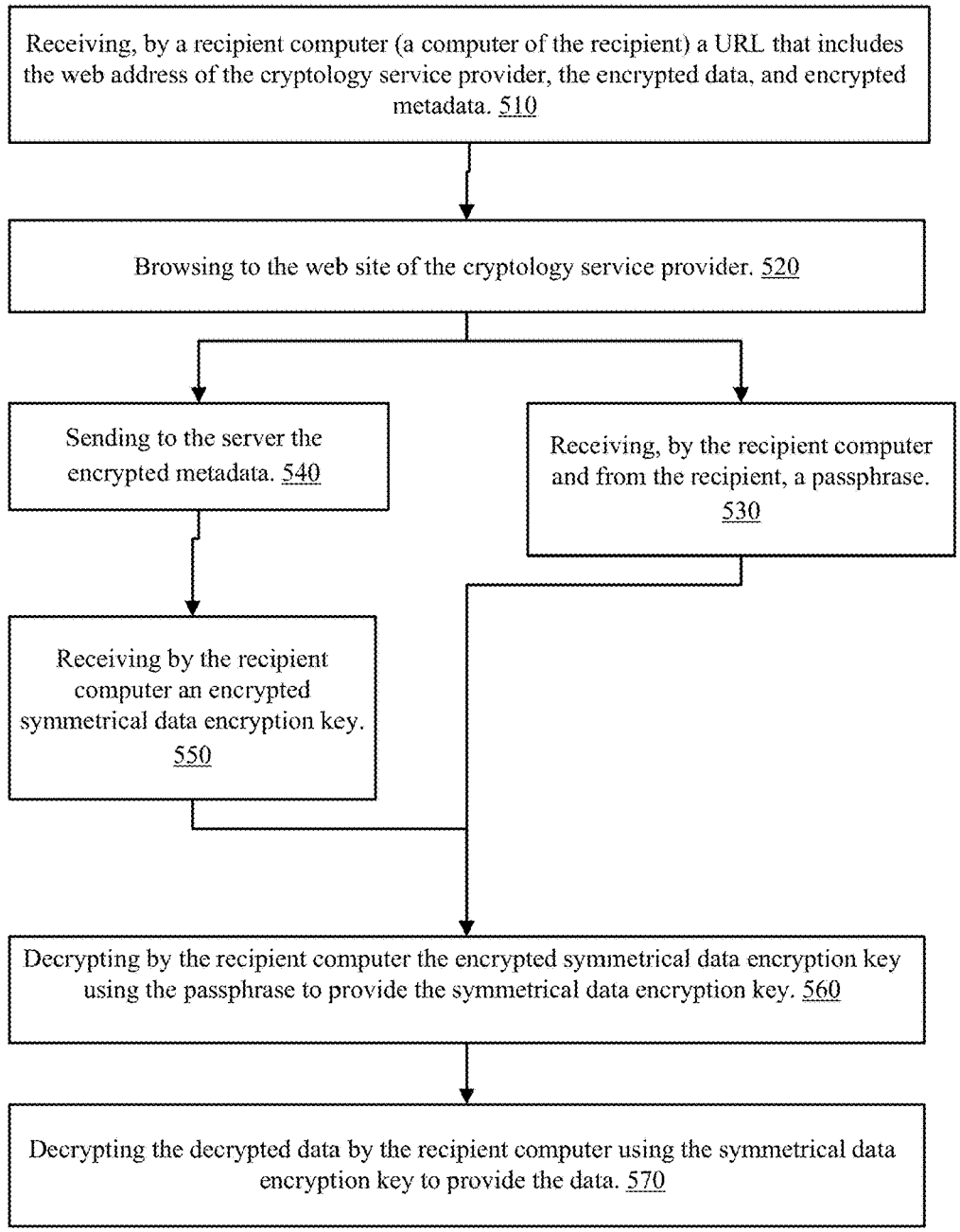
FIG. 6 illustrates an example of a method.

FIG. 6 illustrates method 500.

Method 500 is a decryption method.

Method 500 may start by step 510 of receiving, by a recipient computer (a computer of the recipient) a URL that includes the web address of the cryptography service provider, the encrypted data, and encrypted metadata.

The URL may be displayed to the recipient.

Step 510 may be followed by step 520 of browsing to the web site of the cryptography service provider (using the web address of the cryptography service provider). Step 520 may be triggered by the recipient—for example by clicking or otherwise selecting the URL by the recipient.

Step 520 allows the recipient computer to access a decryption engine that is included in the web site of the cryptography service provider. For example—a web page of the web site of the cryptography service provider may include a decryption program (in JavaScript or another format that could be run within a browser of the recipient computer).

Because encrypted data may be stored in the URL after a flag such as a hash tag (or tagged otherwise) it is not sent to the server by the browser, but will be provided to the decryption program locally in the recipient browser.

Step 520 may be followed by steps 530 and 540.

Step 530 may include receiving, by the recipient computer and from the recipient, the passphrase. The same passphrase was used during step 350 of method 300.

Step 540 may include sending to the server the encrypted metadata. The server should decrypt the encrypted metadata if the decryption is allowed. For example—the server may decrypt the additional metadata to see whether the expiration date was exceeded and/or whether a maximal number of allowed decryptions by the server was exceeded. If so—the server will not decrypt the metadata which includes original encryption key and may notify the recipient computer that the server is unable to complete the decryption. If the decryption is allowed the server will complete the decryption of the encrypted metadata and may send at least a part of the metadata to the client. The server uses the server private key to decrypt the encrypted metadata.

Step 540 may be followed by step 550 of receiving by the recipient computer the encrypted symmetric data encryption key. Step 550 may include receiving the additional metadata or at least parts of the additional metadata.

Steps 530 and 550 are followed by step 560 of decrypting by the recipient computer the encrypted symmetric data encryption key using the passphrase to provide the symmetric data encryption key.

Step 560 is followed by step 570 of decrypting the decrypted data by the recipient computer using the symmetric data encryption key to provide the data.

Due to the symmetric encryption, the symmetric data encryption key is also the symmetric data decryption key.

The data may include a message content and links to attached files. The attached files are stored in an encrypted format and may be decrypted using the symmetric data encryption key.

Figure 7:
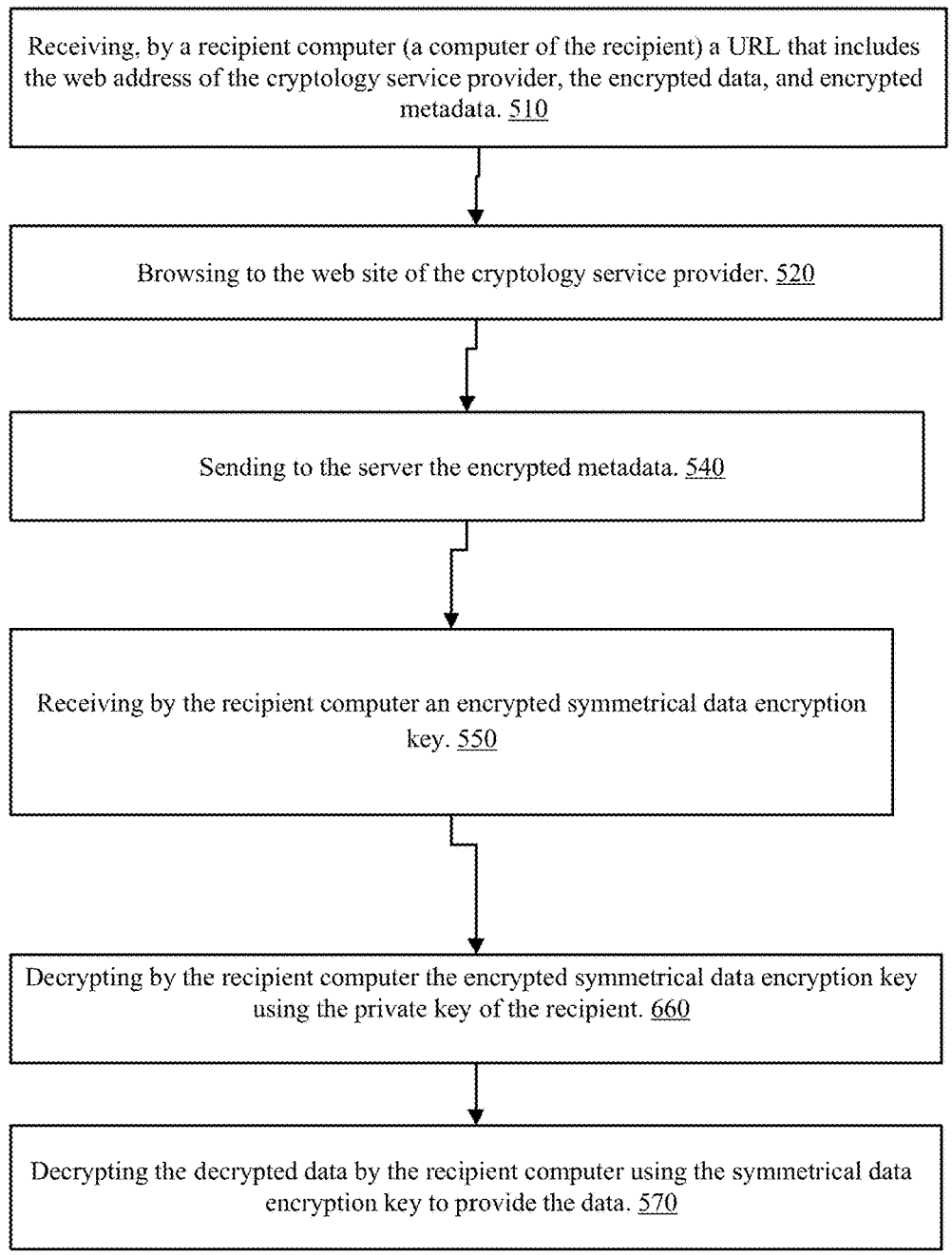
FIG. 7 illustrates an example of a method.

FIG. 7 illustrates method 600.

Method 600 is a decryption method.

Method 600 may start by step 510 of receiving, by a recipient computer (a computer of the recipient) a URL that includes the web address of the cryptography service provider, the encrypted data, and encrypted metadata.

The URL may be displayed to the recipient.

Step 510 may be followed by step 520 of browsing to the web site of the cryptography service provider (using the web address of the cryptography service provider). Step 520 may be triggered by the recipient—for example by clicking or otherwise selecting the URL by the recipient.

Step 520 may not include sending to the server the encrypted data and the encrypted metadata.

Step 520 may be followed by step 540.

Step 540 may include sending to the server the encrypted metadata. The server should decrypt the encrypted metadata if the decryption is allowed. For example—the server may decrypt the additional metadata to see whether the expiration date was exceeded and/or whether a maximal number of allowed decryptions by the server was exceeded. If so—the server will not decrypt the metadata which includes original encryption key and may notify the recipient computer that the server is unable to complete the decryption. If the encryption is allowed the server will complete the decryption of the encryption metadata and may send at least a part of the metadata to the client. The server uses the server private key to decrypt the encrypted metadata.

Step 540 may be followed by step 550 of receiving by the recipient computer the encrypted symmetric data encryption key. Step 550 may include receiving the additional metadata or at least parts of the additional metadata.

Step 550 may be followed by step 660 of decrypting by the recipient computer the encrypted symmetric data encryption key using the private key of the recipient. It should be noted that If recipient is not logged-in he will be requested to log-in in order to get access to his private key.

Step 660 is followed by step 570 of decrypting the decrypted data by the recipient computer using the symmetric data encryption key to provide the data.

Figure 8:
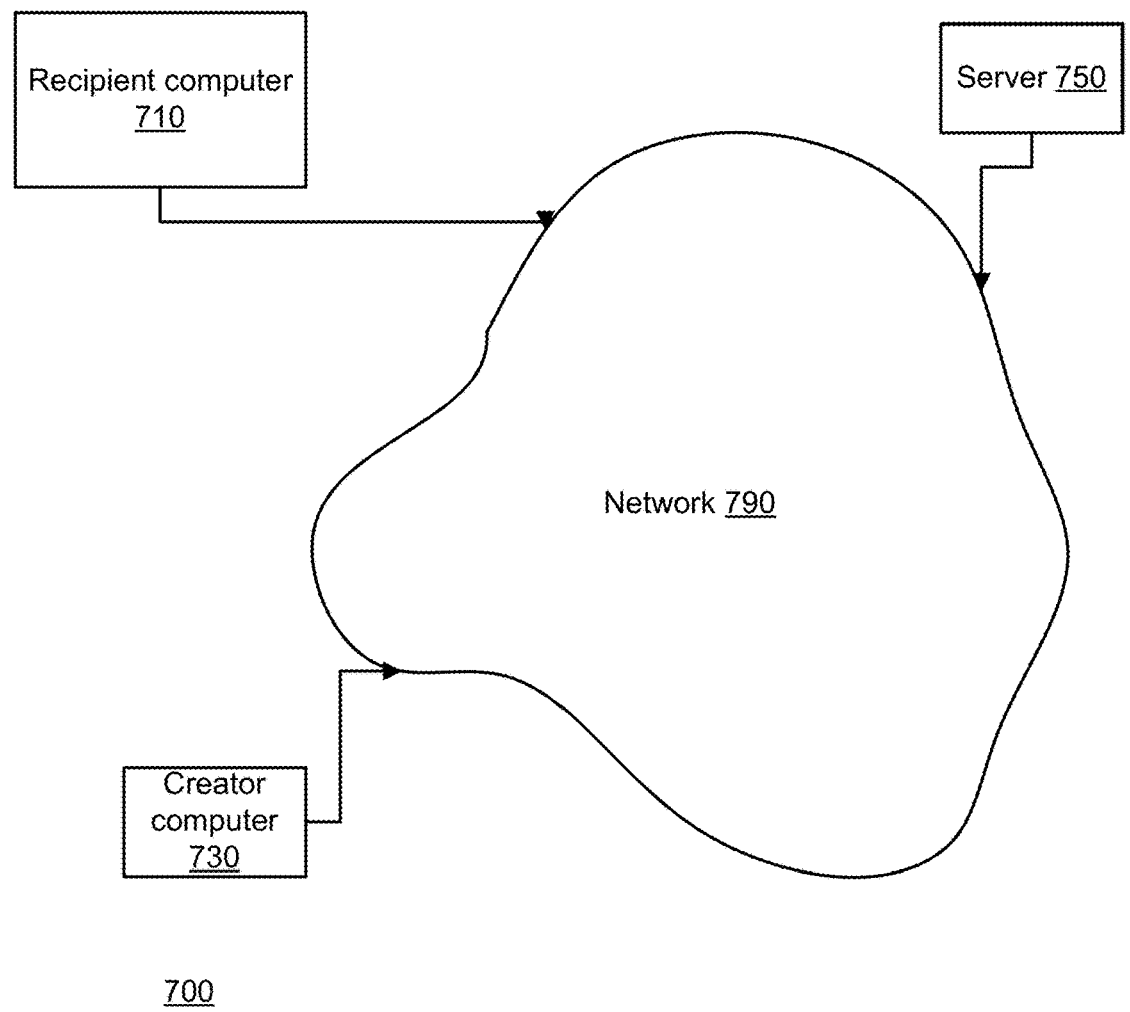
FIG. 8 illustrates an example of a server, a recipient computer and a creator computer.

FIG. 8 illustrates environment 700 that include network (such as the internet) 790, server 750, recipient computer 710 and creator computer 730 that are coupled to the network.

Figure 9:
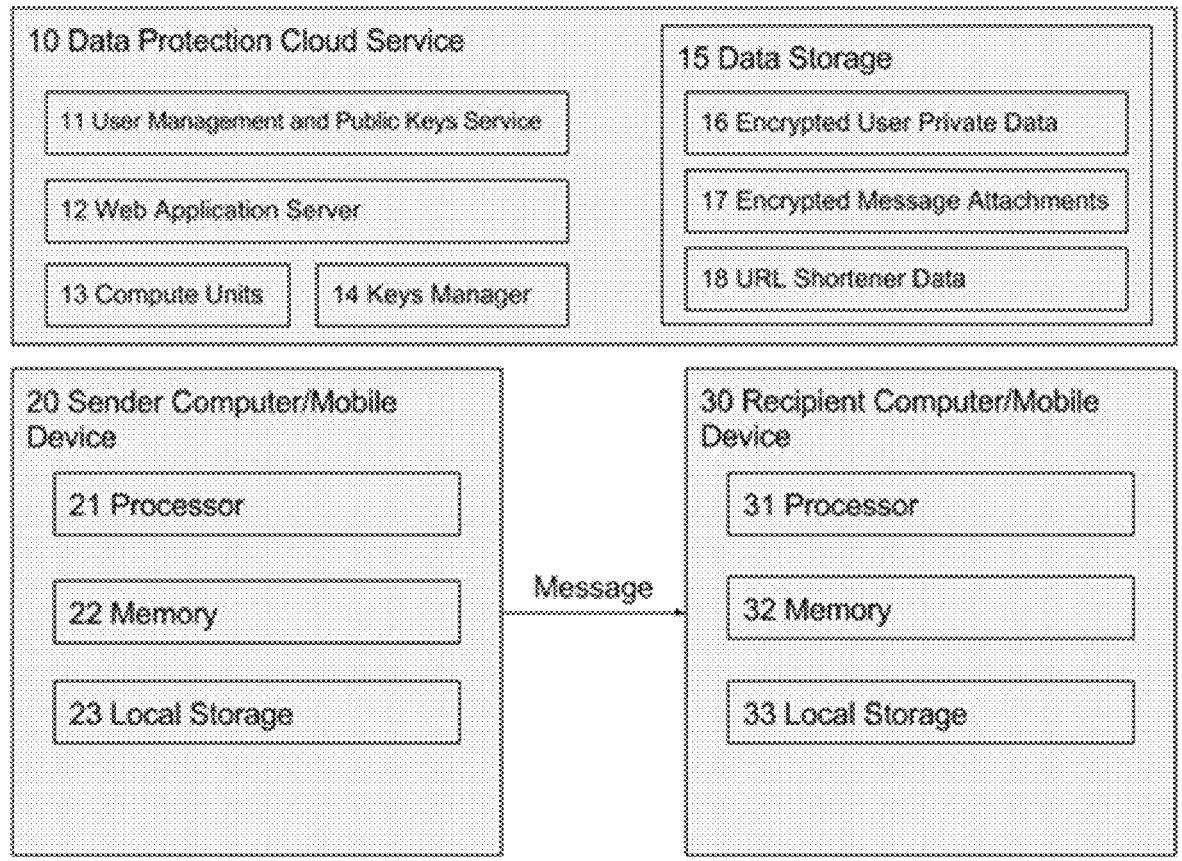
FIG. 9 illustrates various computerized entities.

FIG. 9 illustrates various computerized units.

Data Protection Cloud Service 10 implements all the cloud functionality.

It includes:
a. 11 User Management and Public Keys Service is responsible for Sign Up, Sign In and user data storage. It also stores and serves unencrypted public keys for registered users.
b. 12 Web Application Server serves sign up/sign in, encryption, decryption and personal pages, as well as contact manager, settings and administration interfaces
c. 13 Compute Units perform all the computational and business logic operations
d. 14 Keys manager is responsible for secure storage and management of the Service keys
e. 15 Data storage service stores:
f. 16 Encrypted User Private Data—which contains private keys and contact manager data
g. 17 Encrypted Message Attachments
h. 18 URL Shortener Data for encrypted messages, allowing to replace long message link with all the message data in it by short Uniform Resource Locator (URL).

20 Sender Computer/Mobile Device with:
a. 21 Processor
b. 22 Memory
c. 23 Local Storage—keeping login session data including session encryption key

Figure 10:
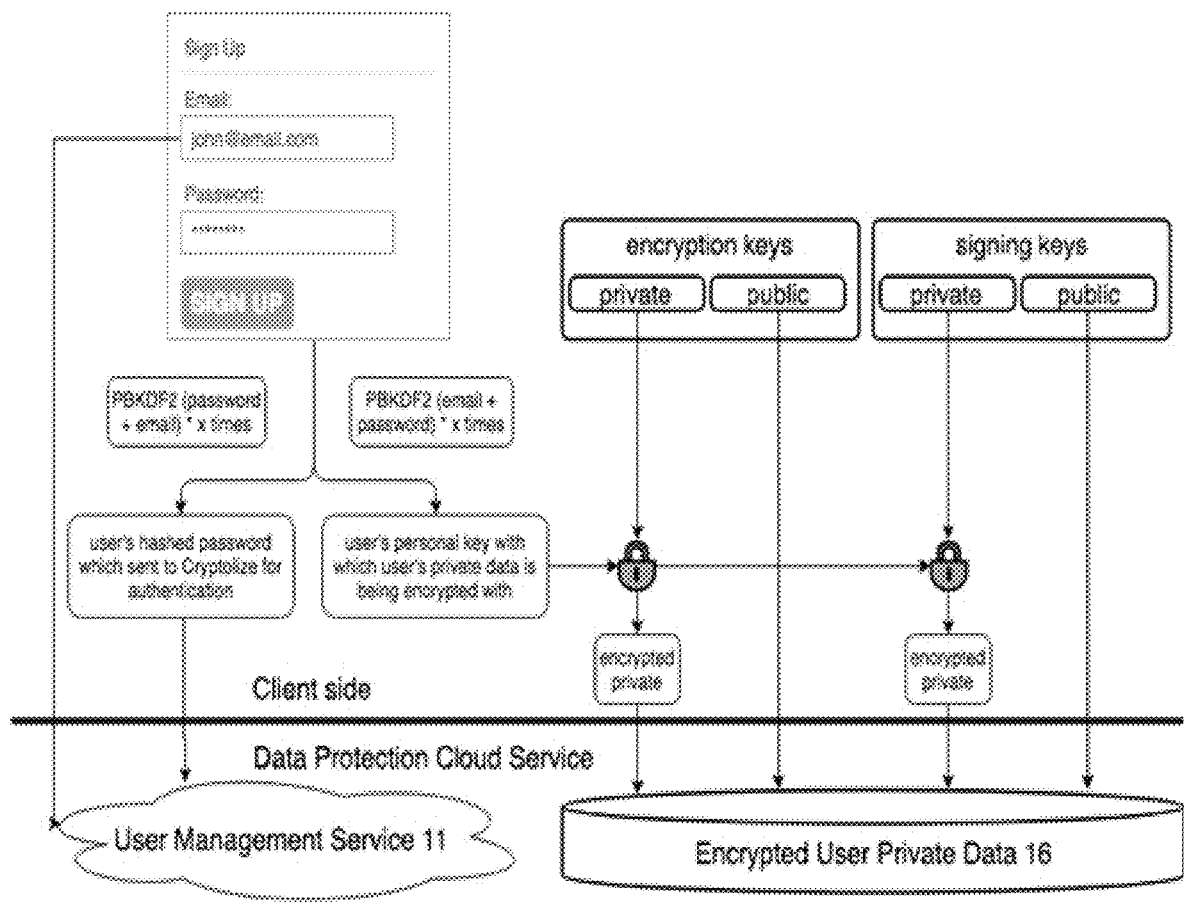
FIGS. 10-22 illustrate various entities and steps related to various operations.

30 Recipient Computer/Mobile Device with:
a. 31 Processor
b. 32 Memory
c. 33 Local Storage—keeping login session data including session encryption key FIG. 10 illustrates various entities and steps related to method 100.

Figure 11:
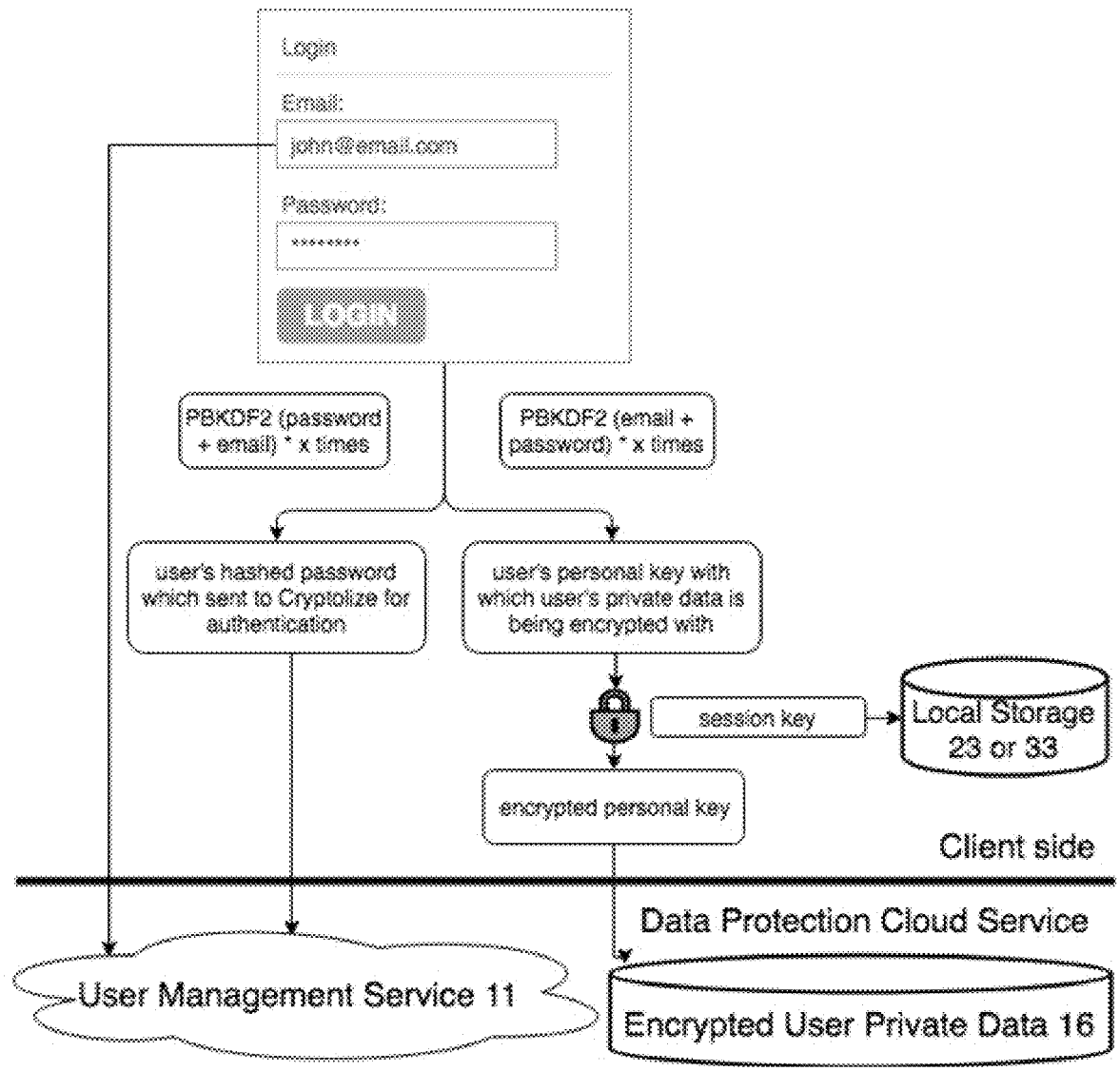

FIG. 11 illustrates various entities and steps related to method 200.

User Private Data

Figure 12:
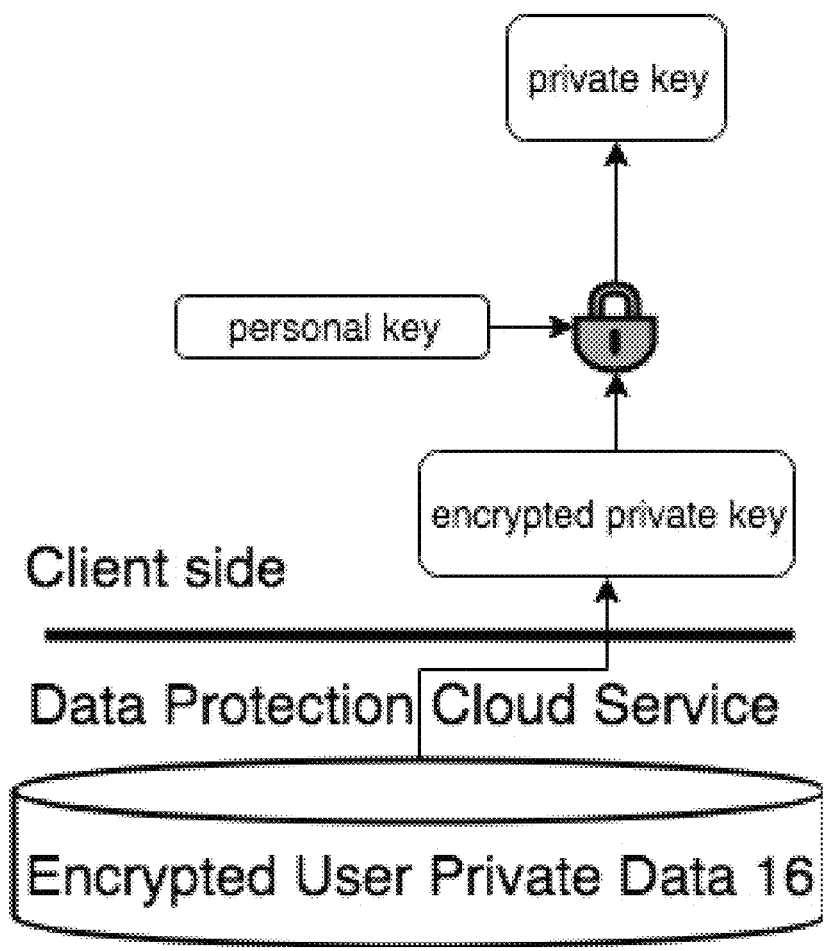

Every time when encryption/decryption program running in the user browser needs user private data (e.g. private keys for message decryption/signing and contact manager data), it requests corresponding Encrypted User Private Data 16 from the Data Storage 15 and decrypts it with the user personal key, in case it already in the browser memory—see FIG. 12.

Figure 13:
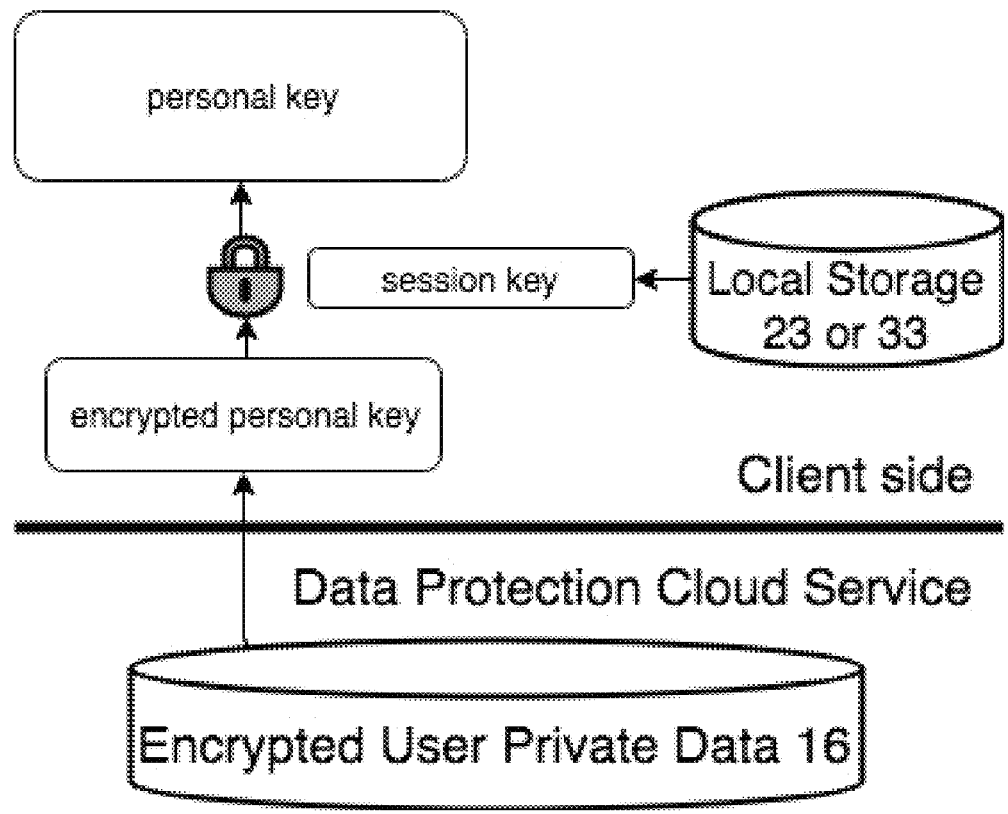

In case the personal key doesn't exist in memory, the encrypted personal key will be retrieved from the Encrypted User Private Data 16 from the Data Storage 15 and will be decrypted with the session key stored in the Local Storage 23 or 33 (was added there while user signed-in in step 260) without a need to ask signed-in user for the user password. See FIG. 13.

The decrypted private data and personal key are stored in memory only

Contact Manager

User has client side only Contact Manager which enables him to store contacts with their symmetric passphrase. Then, when user chooses one of the contacts as a recipient, symmetric passphrase will be inserted automatically.

The Contact manager data is a part of the User Private Data and is stored encrypted in the Data Storage. It always leaves the user computer or mobile device only after it was encrypted with the personal key (described in the Sign-up and log-in sections).

Figure 14:
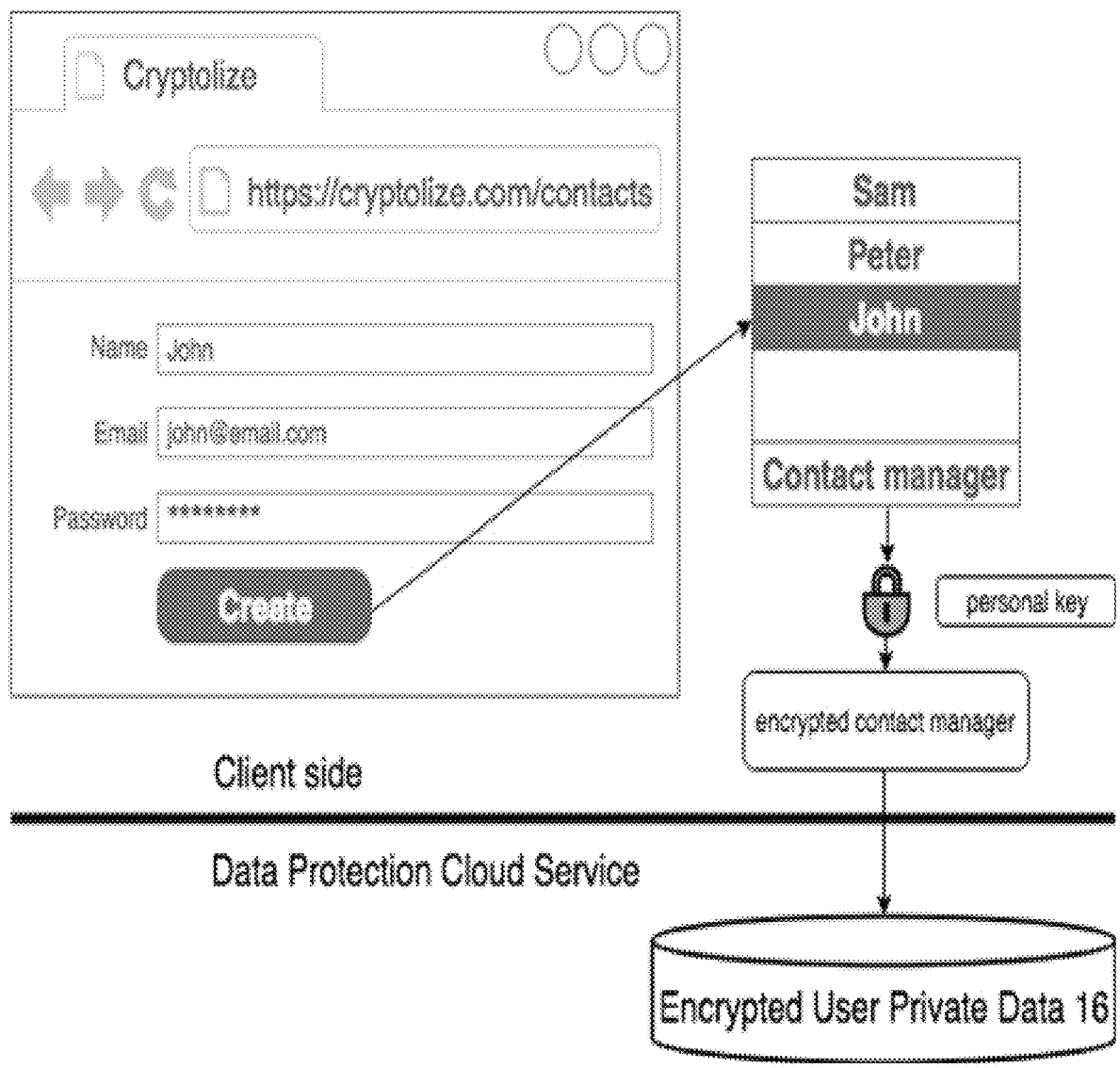

Contact manager supports automatic generation of secure passphrases. See FIG. 14.

Figure 15:
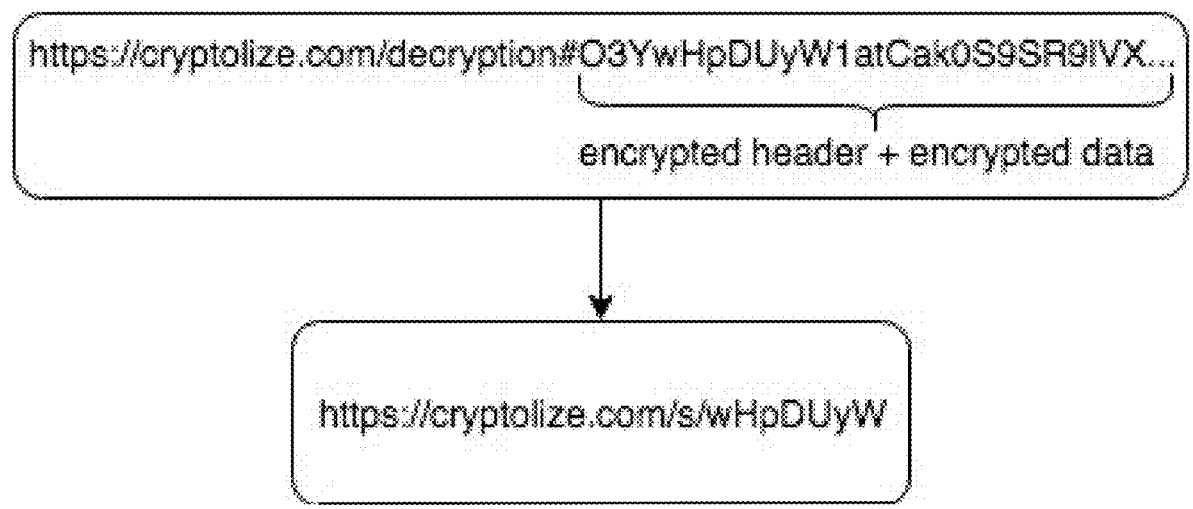

FIG. 15 illustrates a shortening of a URL-related to method 300.

Figure 16:
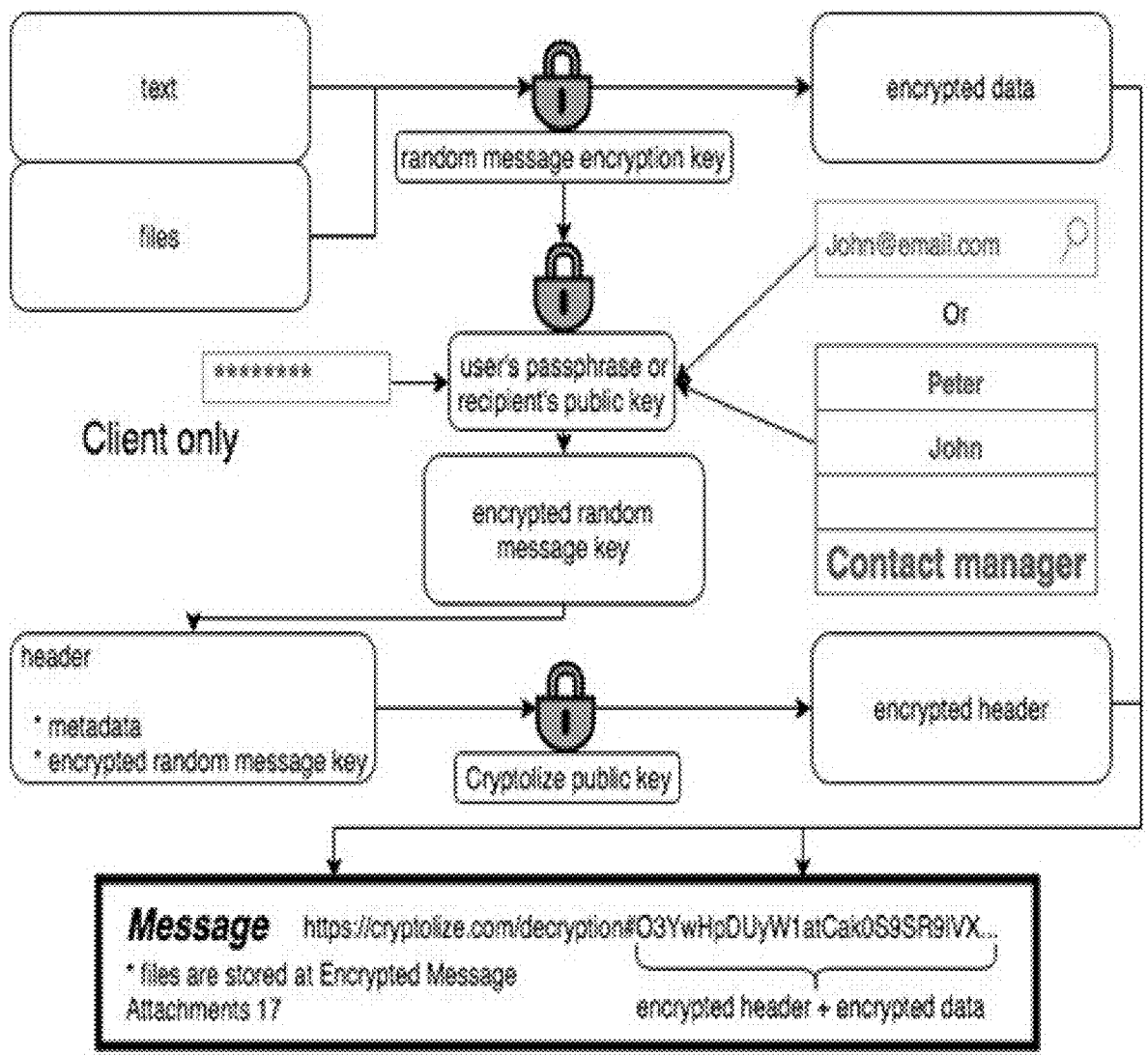

FIG. 16 illustrates various entities and steps related to method 300.

Figure 17:
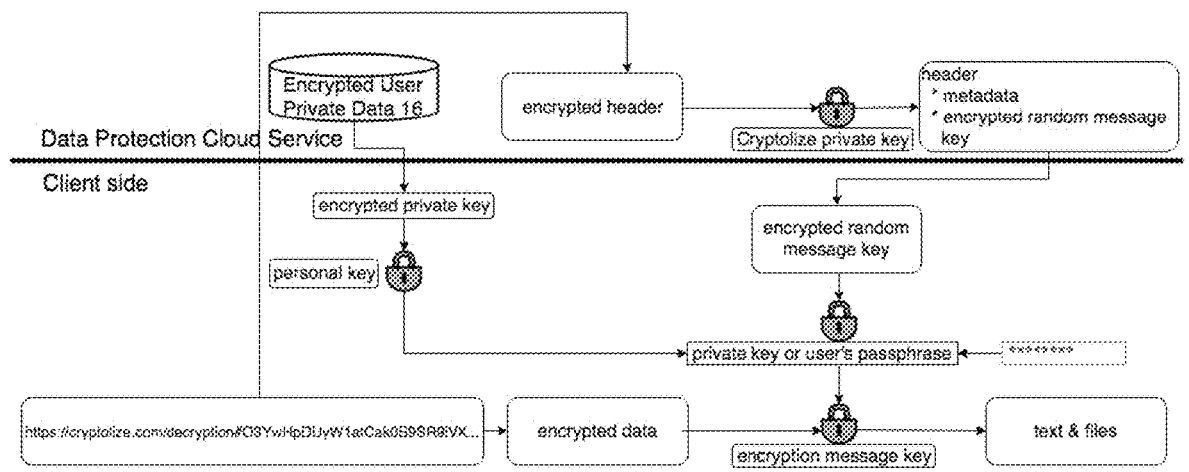

FIG. 17 illustrates various entities and steps related to method 400.

Message Reply

Following message decryption in step 570, the user has an option to reply to the message.

a. If the original message was sent by signed-in user, his id was included in metadata and was returned to decryption page from the server. On clicking "Reply" on the decrypted message page, the application goes to the encryption page and automatically provides sender id from the original mail as a new recipient, allowing encryption program automatic selection of corresponding public key for the message encryption.

b. If the original message was sent not by anonymous user using symmetric encryption, on clicking "Reply" on the decrypted message page, the application goes to the encryption page and automatically provides the passphrase from the original message for message encryption.

All the other steps of encryption process will be the same as in regular encryption method.

Specific mechanism for transfer of passphrase of original sender/new recipient id from decryption page to encryption page for reply will depend on specific implementation of encryption/decryption programs. If it is one page application, the data could be just kept in memory. If encryption and decryption programs run by different pages that have no shared memory, the data could be stored in local storage or even transferred encrypted thru web service—like personal key encrypted with session key in step 260. Another way to transfer the data to the encryption page would be by putting it in URL itself, optionally after the hash tag "#" to prevent this data uploading to the server.

Message Forwarding

Following message decryption in step 570, the user has an option to forward the message to any recipient.

a. On clicking "Forward" on the decrypted message page, the application goes to the encryption page, provides it with original message encryption key and automatically fills text and attachments from the original message. User can still edit the message text and add or remove attachments.

b. After that for forwarding a message without original attachments the encryption program performs the regular encryption starting from step 330. New attachments could be added and handled according to the method 300.

For message with original attachments, they could be included into the new message in two ways:

a. Instead of generating random message key in step 330, the encryption program can use the message key from the original message that was received from the original decryption page. In this case all the original attachments are already encrypted with this message key and already stored in Data Storage 15, so there is no need to encrypt and upload them—they should be just added to the list of attachments.

b. Another option is to generate new random message key by performing regular step 330. After that, instead of reading attachments data from user computer or mobile device (as in regular step 350), the encryption program downloads encrypted attachments from the Data Storage 15, decrypts them with the original message key received from the original decryption page, encrypts them with the new message key generated in step 330 and uploads them to the Data Storage 15, while updating the message attachments list with the new location of the encrypted attachments.

Additional way to forward the message is to create a new message that will contain decryption keys for the original message, which are encrypted for the new recipient and a pointer to the original message. In this case:

a. On clicking "Forward" on the decrypted message page, the application goes to the encryption page, provides it with original message encryption key and original message URL.

b. Encryption program adds the forwarded message key and forwarded message URL as a special section to the new message and, after that, follows all the regular steps in the Encryption Method 300—encrypting the forwarded message section together with all the additional message data.

In order to decrypt such a forwarded message, decryption program following the decryption of the message in regular step 570 will check for forwarded message section and, if present, will retrieve it from provided forwarded message URL and decrypt it using provided forwarded message key.

Specific mechanism for transfer of original message key and original message URL from decryption page to encryption page for forwarding will depend on specific implementation of encryption/decryption programs. If it is one page application, the data could be just kept in memory. If encryption and decryption programs run by different pages that have no shared memory, the data could be stored in local storage or even transferred encrypted thru web service—like personal key encrypted with session key in step 260. Another way to transfer the data to the encryption page would be by putting it in URL itself, optionally after the hash tag "#" to prevent this data uploading to the server.

Personal Page

Personal Page allows registered user to receive messages encrypted with his public key from anybody on the web—directly to their preferred communication channel—email, SMS, instant messaging, etc. . . . . . The personal page URL on the Web Application Server 15 could be customized by user to include his name, business brand or any other keyword—like domain names on the Web.

The personal page includes encryption program implementing the asymmetric Encryption Method 400 with the following modifications in step 450: sender doesn't have an option to provide recipient—the encryption program automatically sets recipient to the Personal Page owner and uses his public key for message encryption.

In addition, after the message URL is created, it is automatically sent to the Personal Page owner thru his preferred communication channel.

The Personal Page could be customized by its owner to include additional fields like sender name, email, phone, etc. . . . . . The values provided by sender in this field will be added to the message in a structured form and encrypted together with the main text and optional attachments.

Figure 18:
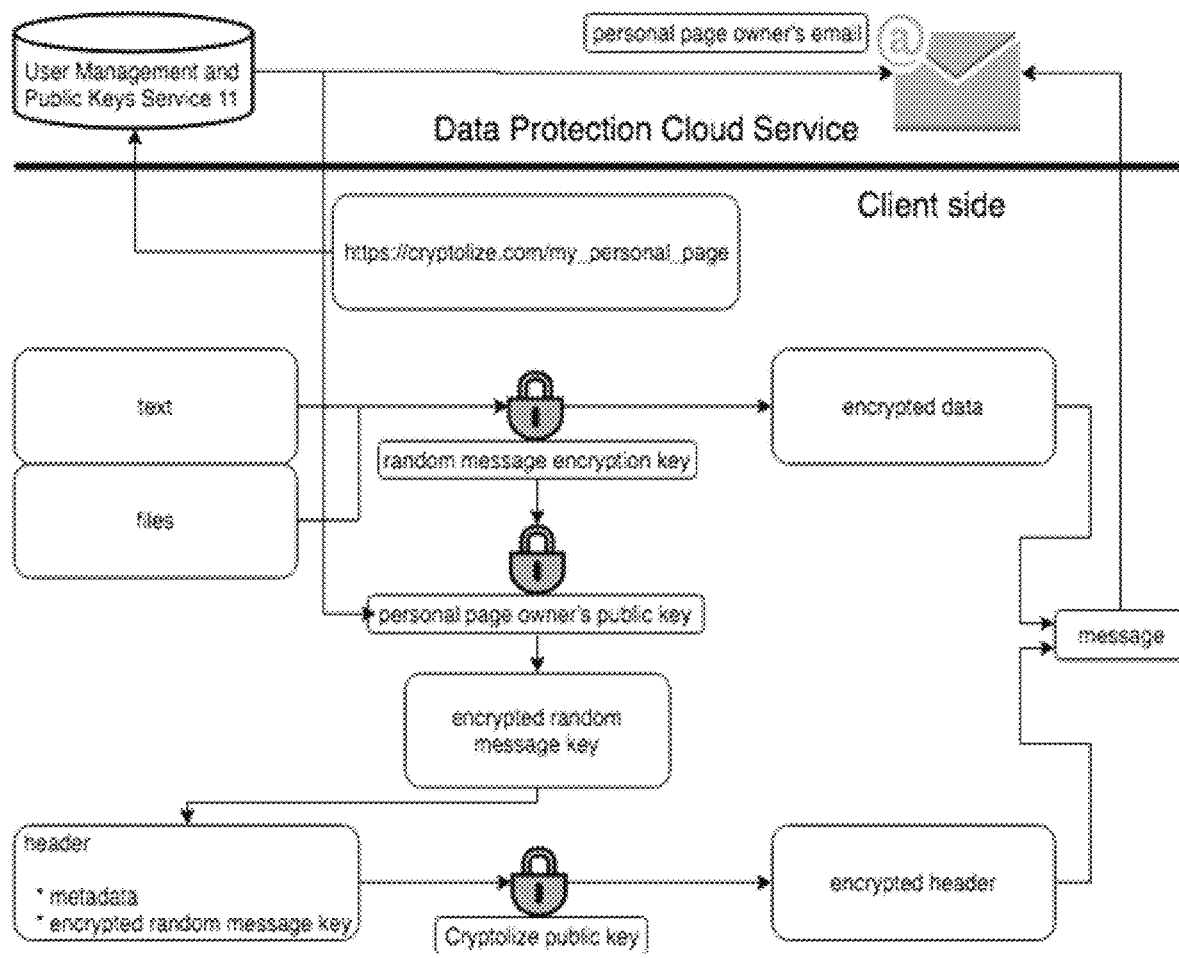
Figure 19:
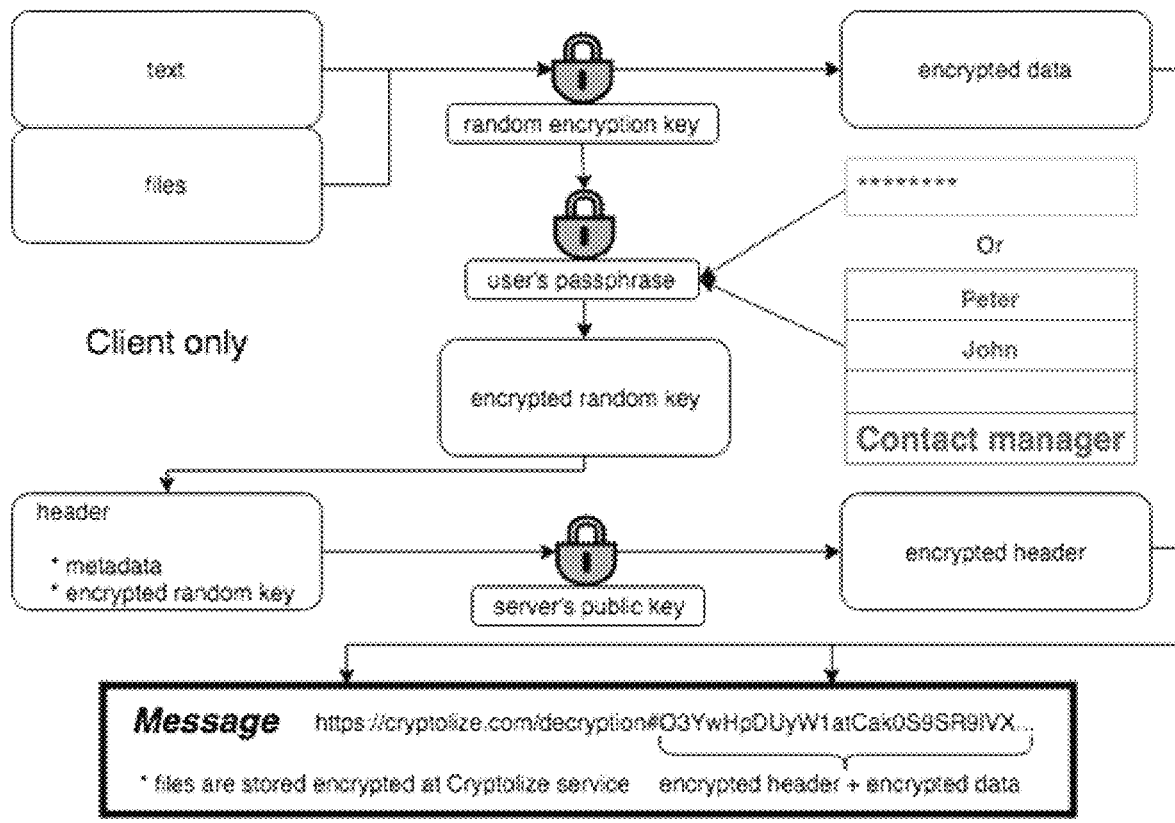
Figure 20:
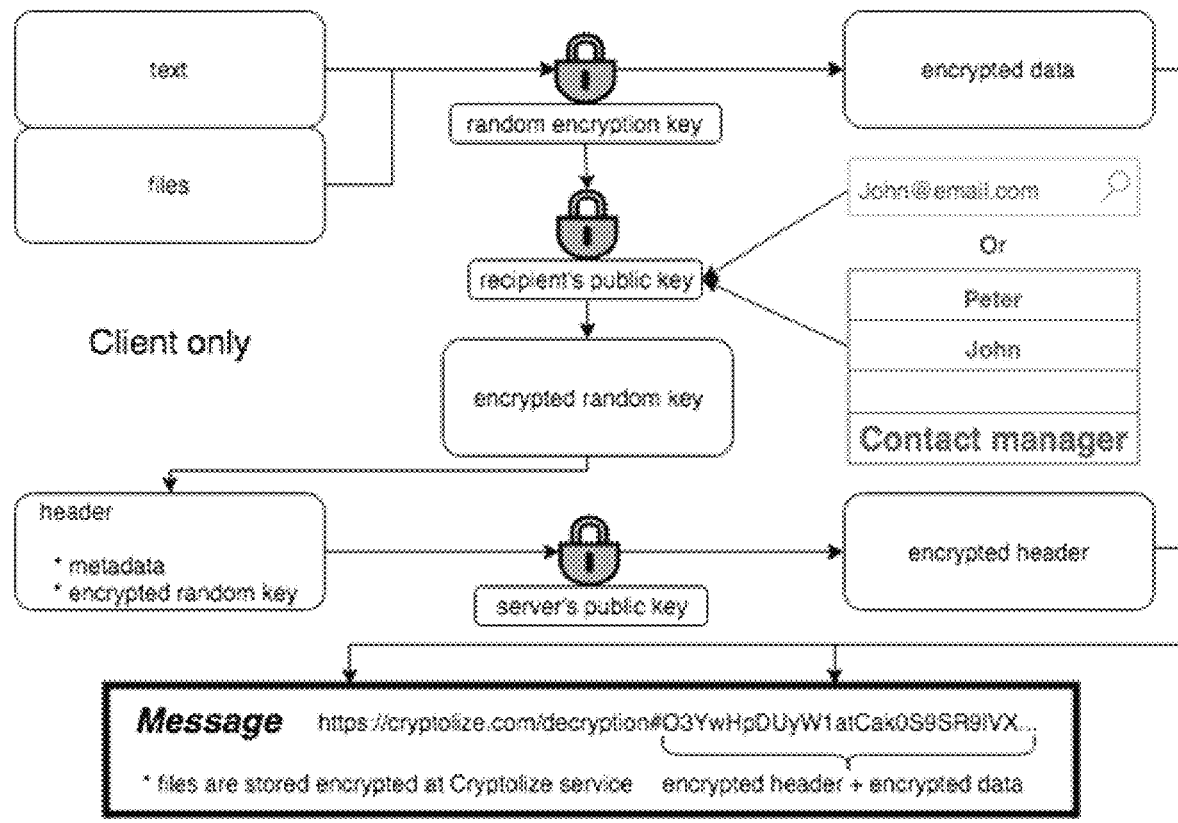
Figure 21:
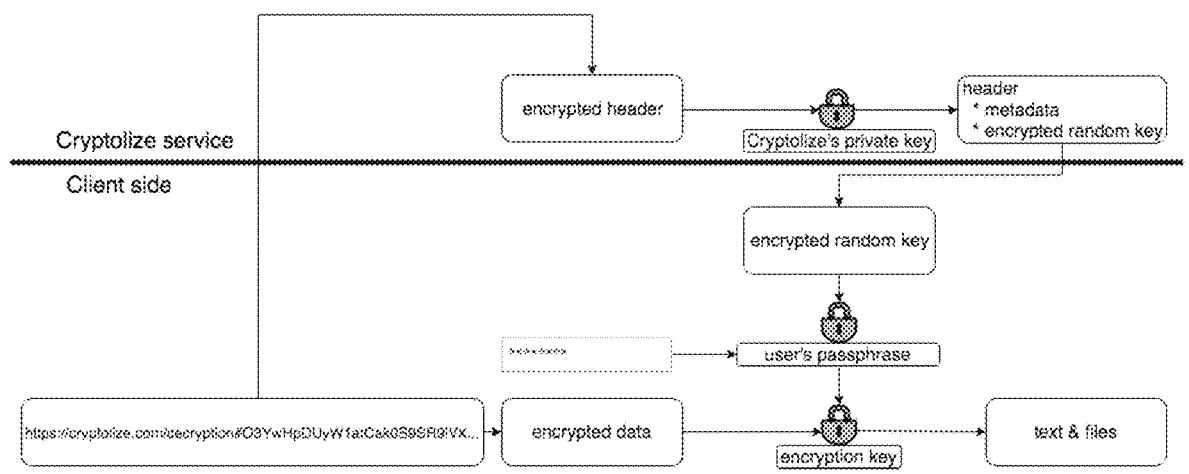
Figure 22:
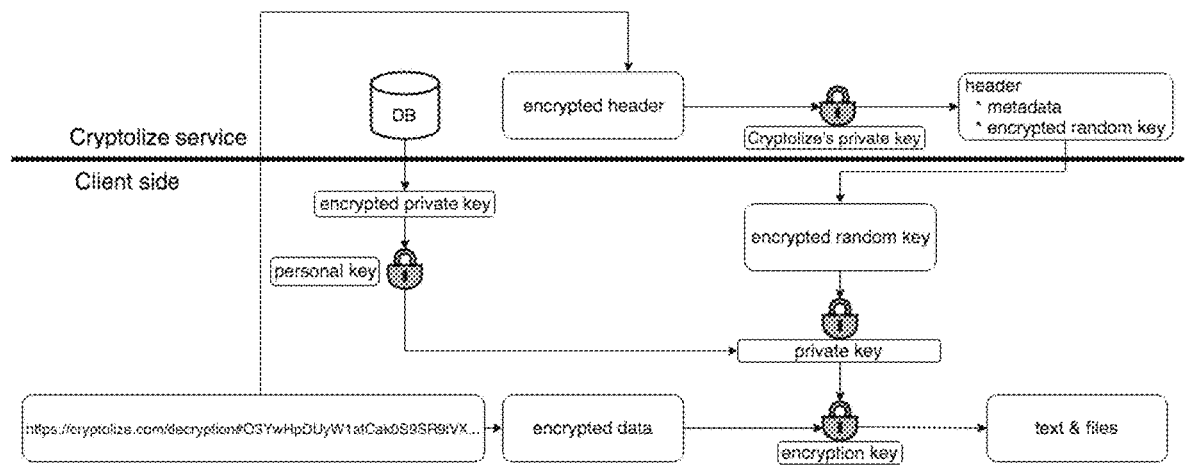

FIG. 18 illustrates various entities and steps related to the personal page.

Disabling Messages

Every message is encrypted both with user key or passphrase and with cloud service key on top of it. In order for user to be able to decrypt message, the cloud service should decrypt the metadata before that. Message creator (or organization administrator) can tell cloud service to disable any sent message. It could be done either by keeping list of disabled messages on the Data Protection Cloud Service 10 or by erasing the specific key that was used to encrypt metadata of this message from Keys Manager 14. After message is disabled, it will fail validity check in decryption step 540 and the Cloud Service will not return a recipient decrypted metadata, preventing decryption of the message.

Private Data Recovery if Password is Lost

If user forgets his password, he can reset it on the Cloud Service, but because his private data including private keys is stored in Data Storage 15 encrypted with personal key and personal key is generated on base of his previous password, he will not be able to decrypt his private data—and will not be able to decrypt his previous messages. The Cloud Service is zero knowledge and can't decrypt the private data as well.

The recovery procedure uses one of the known secret sharing methods for distributing a secret amongst a group of N participants, each of whom is allocated a share of the secret. The secret can be reconstructed only when a sufficient number (M) of shares are combined together; individual shares are of no use on their own.

The following procedure could be initiated by user while he has his password to allow Private Data Recovery in the future:
 a. User goes to Data Recovery Configuration Page on the Web Application Server 12 and loads the page with corresponding data recovery configuration program.
 b. User selects N contact persons and data recovery configuration program creates N shares of the user personal key, encrypts each share for the specific contact and sends it to him as a special recovery message.
 c. Each recipient stores recovery message.
 d. If user forgets his password he resets the password. During password reset a new personal key and server password are created on base of a new user password as in steps 130 and 140 of the sign-up method, a new public/private key pairs are created and encrypted with the new personal key—as in step 150 of the sign-up process—and stored in Data Storage 15 as a new section of Encrypted User Private Data 16. After that user asks his contacts keeping shares of his personal key to forward him back the recovery messages.
 e. On receiving each of recovery messages user opens them. Decryption program detects that it is a special recovery messages, checks the number of already received shares in local storage 33 and, if number is less than M, which is needed for personal key recovery, stores the corresponding share together with counter of received shares in the Local Storage 33.
 f. When user opens recovery message number M, it combines all the shares to retrieve the original personal key, retrieves the original Encrypted User Private Data 16, decrypts it with the original personal key and re-encrypts it with the new personal key generated in step d—to be stored together with a new key pairs generated in step (d) in Data Storage 15 as a new Encrypted User Private Data.

An example of a simple secret sharing method for M=N (all the shares are need to restore the personal key):

N−1 shares are random numbers of the same length as the personal key, the last share is a result of XOR operation between N−1 random shares and the personal key.

When all the shares are received back XOR of all of them produces the original personal key.

A preferred implementation would be sharing secret with 3 people while requiring any two of them for recovery. In this case we generate 3 random numbers a, b and c of the same length as the personal key. After that we calculate XOR of each of the numbers with the personal key P:
A=a XOR P
B=b XOR P
C=c XOR P After that we send to three contacts the following data:
Contact 1: a and B
Contact 2: b and C
Contact 3: c and A The personal key P could be restored by one of the following XOR operations:
P=a XOR A
P=b XOR B
P=c XOR C Any two contacts keep one of the pairs needed for recovery.

Any other secret sharing method could be used as well, including Shamir's Secret Sharing.

Folders

Encrypted messages could be organized into folders—like financial, legal, medical info for personal users or customer folders for business users. One possible implementation is when there is a folders array per user, where each folder record holds shortened URL for the last message created in this folder and every message metadata includes shortened URL for the previous message in this folder (or array or previous message pointers if message belongs to more than one folder). When new message in folder is created, it copies URLs for the last messages in the corresponding folders to the new message header and updates user folder array with its own shortened URL, representing every folder by linked list with minimal storage requirements on the server. The user folder array is managed in user browser and stored on the Data Storage 15 in encrypted form as part of a Encrypted User Private Data.

Web App Messages

Data Protection Cloud Service supports special message format that contains URL for the corresponding Web App.

When such message is decrypted, instead of showing decrypted data to user is step 460, corresponding Web App opens automatically and decrypted data is passed to it.

Example—user locations history on the map, where the message contains coordinates of the location and link to the web based map app. When user opens such a message, instead of seeing two coordinates of the point in step 570, he will be redirected to web based map application that will be open at specified location.

Such a message could be created either manually by providing message text in a special format and using regular encryption method 300, 302 or 400 or automatically from the same or another Web App by modifying the encryption methods 300, 302 or 400 to receive data from application and not from user.

Specific mechanism for transfer of the data between decryption page and the Web App will depend on specific implementation of encryption/decryption programs and Web App. If it is one page application, the data could be just kept in memory. If encryption/decryption program and Web App run by different pages that have no shared memory, the data could be transferred thru Data Storage or be by putting it in URL itself, optionally after the hash tag "#" to prevent the data traveling over the network and uploading to a web server.

IoT Communication

Protection of data exchange with IoT devices is a very serious issue and Data Protection Cloud Service infrastructure could be used for this purpose. IoT device could implement encryption methods 300, 302 or 400 by program running on it's processor, while modifying the encryption method to get the data for the message from device instead of from user. IoT device can create encrypted messages of two types:
 a. regular message that could be directly open by user (e.g. log file of home alarm events in text form)
 b. Web App messages that could be open by Web App (which, for example, could import the data into 3rd party system—or shown within web app—like car locations history on the map collected by the car gps system)

IoT device could also implement decryption methods 400 and/or 500 by program running on it's processor, while modifying step 570 to use message content to control device instead of showing it to the user.

Data Exchange Between Information Systems

The Data Protection Cloud Service infrastructure could be used for data exchange between different systems when one information system is a sender and another information system is a receiver of encrypted messages, where each message (of special data exchange type) represent a data unit from the exporting system. Similar to Web App messages, when such a message is decrypted, the data could be transferred to a Web App serving for data import into the second system. For example, it could be used for data exchange between different hospitals or banks—or between hospitals and patients.

Multi-Block Messages

One message could contain a number of different data blocks encrypted with different keys—providing separate access control for different types of data. For example purchase orders, where personal information encrypted with user key and more generic order info encrypted with different keys used by analytic companies for data aggregation (or medical information with strongly protected personal data and anonymous study data accessible to research companies).

Payments Support

Special encrypted message format that includes credit card or bank account details (with optional amount) that is encrypted for recipient, which is able to automatically import payment data into his payment system—or just decrypt the data. A part of the message with credit card data or bank account data and payment amount could be encrypted directly for payment processor by using its public key, so recipient will not get access to credit card or bank details. In this case recipient receives payment details from payer, but is not able to decrypt credit card data because he doesn't have the key—he can only transfer it to payment processor who will decrypt the data and process the payment. The message could be additionally protected by expiration date (or "once" mode).

Two Step (Two factor) Authentication

Both symmetric and asymmetric encryption could be combined with two step authentication functionality—using any of standard approaches like special hardware device generating temporary keys, mobile authenticator app or just sms or voice call to user phone.

Two Step Authentication could be used both for user login (in step 250 cloud service requests additional authentication code—sent by sms or generated by hardware device or authenticator app) and at individual message level, when additional authentication code is requested in step 540, before server decrypts message metadata.

User Data Storage

Some users and client organizations would prefer not to store even encrypted data at 3rd party cloud service (and sometimes law requires to store sensitive data within country borders).

The Data Protection Cloud Service supports replacing Data Storage 15 service by user data storage, that is hosted by user or client organization and supports the same functionality.

Copyright Protection—Digital Rights Management (DRM)

The Data Protection Cloud Service could be used for digital rights management, when specific documents are encrypted for specific users and attached to the message of a special DRM type. When such a message is open by user, decryption program in step 570 of the decryption method 500 or 600 doesn't allow decrypted document download—only viewing in a special web based viewer. As an additional protection the decryption program could transfer decrypted document to the viewer on a page-by-page basis, with detection of robot scripts, to prevent hackers from access to the full decrypted document.

Zero Knowledge Message Organization and Search

Cloud Service is zero knowledge and can't access message content, so it could not provide search functionality over sent and received messages. In order to allow user to search in sent or received messages, we propose to add indexing step 345 after step 340 in encryption methods 300, 302 and 400 as well as step 575 after step 570 in decryption methods 500 and 600.

Both steps 345 and 575 have similar functionality—indexing of decrypted messages (sent or received) and, optionally, attachments—using any or well known methods for text and data indexing. In encryption method we will also need additional step at the end of encryption process to update index with message full or shorten URL after it is generated—because when step 345 is executed no message link exists yet.

Search index could be kept in memory of the browser (or, optionally, in the local storage) and could be stored in Data Storage 15 in encrypted form as part of Encrypted User Private Data 16—in the same way as contact manager data.

Such index could be an additional way to implement message list and folders functionality—in addition to what is described in "Folders" section.

Local Application Implementation

The security of the system is based on security of encryption and decryption programs loaded into user browser from Web Application Server 12.

FIGS. 19-22 illustrates symmetrical and asymmetrical encryption and decryption.

In case of successful phishing attack, the attacker could be able to direct the user to his own server and serve his version of encryption and decryption program, giving him access to user password and sensitive data.

To prevent such a risk, it is possible to replace Web Application Server 12 and encryption/decryption programs in user browser functionality by local application running on user computer or mobile device, which performs exactly the same functionality and implements the methods described above—and interfaces with all the other Cloud Services like User Management and Public Keys Service 11, Compute Units 13, Keys manager 14 and Data Storage 15. In this case it is enough to verify local application once during installation (for example, by organization administrator installing verified version with known checksum)—instead of taking risk of downloading encryption/decryption programs for every message.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product that may be or may include a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

Also, for example, the examples, or portions thereof, may implement as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A computerized method for exchange of data using a creator computer and a recipient computer, the method comprises:
   browsing, by a web browser of the creator computer, to a web address related to an encryption engine of a cryptography service provider, and opening the encryption engine;
   generating by the creator computer a data encryption key using the encryption engine;
   encrypting, by the creator computer and using the encryption engine, data with the data encryption key to provide encrypted data;
   encrypting, by the creator computer and using the encryption engine, the data encryption key to generate an encrypted data encryption key;
   generating, by the creator computer and using the encryption engine, a uniform resource locator that includes a web address related to a decryption engine of the cryptography service provider, the encrypted data and encrypted metadata;
   sending the uniform resource locator to the recipient computer;
   receiving, by the recipient computer, the uniform resource locator that includes the web address that is related to the decryption engine of the cryptography service provider, the encrypted data and the encrypted metadata;
   browsing, by the recipient computer, to the web address that is related to the decryption engine of the cryptography service provider;
   sending the encrypted metadata to a server that is associated with the cryptography service provider;
   receiving from the server at least a portion of the metadata; the at least portion comprises an encrypted data encryption key;
   decrypting, by the recipient computer and using the decryption engine, the encrypted data encryption key to provide the data encryption key; and
   decrypting, by the recipient computer and using the decryption engine, the encrypted data to provide data.

2. The method according to claim 1 comprising generating the encrypted metadata; and wherein the encrypted data belongs to a message.

3. The method according to claim 2 wherein the generating of the encrypted metadata comprises generating a message metadata that comprises the encrypted data encryption key and additional metadata; and encrypting the message metadata to generate the encrypted metadata that is decryptable by the server.

4. The method according to claim 2 wherein the additional metadata comprises at least one of the following: information about expiration date, information about a maximal number of allowed decryptions by the server.

5. The method according to claim 1 comprising shortening the uniform resource locator.

6. The method according to claim 1 comprising sending the encrypted data to multiple recipients; and generating multiple encrypted data encryption keys, at least one data encryption key per recipient, by using public keys or passphrases of the multiple recipients.

7. The method according to claim 1 comprising determining by the server, before decrypting the encrypted metadata, whether to decrypt the encrypted metadata; and selectively decrypting the encrypted metadata based on the determining.

8. The method according to claim 1 comprising sending a reply from the recipient computer to the creator computer using an identifier of a user of the creator computer, the identifier included in the encrypted message metadata.

9. The method according to claim 1 wherein the encrypting of the data encryption key to generate the encrypted data encryption key comprising encrypting the data encryption key using a user personal key.

10. The method according to claim 9 further comprising generating a server password based on at least a second part of authentication information provided by the user.

11. The method according to claim 1 wherein the browsing to the web address is related to a first user and a second user is related to the recipient computer; wherein the method comprises receiving a request from the second user to forward a message sent by the first user; and retrieving from the encryption engine at least one key related to a user to which the message is forwarded to.

12. The method according to claim 1 wherein the web address related to the encryption engine of the cryptography service provider is also related to a recipient; and wherein the method comprises automatically fetching, by the encryption engine, a public key of the recipient for encrypting the message.

13. The method according to claim 1 comprising generating metadata that comprises a link to the previous message in a list.

14. The method according to claim 1 wherein the decrypted data is provided to a web application.

15. The method according to claim 1 wherein the encrypted data comprises data blocks, each of the data blocks is encrypted with a different a encryption key and each of the corresponding keys is encrypted for different groups of recipients.

16. The method according to claim 15 wherein at least one of the data blocks comprises payment information encrypted by keys of a financial institution, the keys of the financial institution are not provided to the recipient.

17. The method according to claim 1 wherein the encrypting of a user private data to generate an encrypted user private data comprises encrypting the user private data using a user personal key.

18. The method according to claim 17 wherein the user private data comprises at least one out of user encryption keys, user contacts details, search index for sent and received messages.

19. The method according to claim 18 comprising storing at least a part of the user private data in at least one of a cache and a remote data storage.

* * * * *